US008369590B2

(12) United States Patent
Wang et al.

(10) Patent No.: US 8,369,590 B2
(45) Date of Patent: Feb. 5, 2013

(54) METHOD FOR SEGMENTING OBJECTS IN IMAGES

(75) Inventors: Yi Wang, New York, NY (US); Noel C. F. Codella, New York, NY (US); Hae-Yeou Lee, Yuseong-gu (KR)

(73) Assignee: Cornell University, Ithaca, NY (US)

( * ) Notice: Subject to any disclaimer, the term of this patent is extended or adjusted under 35 U.S.C. 154(b) by 1201 days.

(21) Appl. No.: 12/124,973

(22) Filed: May 21, 2008

(65) Prior Publication Data

US 2008/0292169 A1 Nov. 27, 2008

Related U.S. Application Data

(60) Provisional application No. 61/066,217, filed on Feb. 19, 2008, provisional application No. 60/931,126, filed on May 21, 2007.

(51) Int. Cl.
*G06K 9/00* (2006.01)
(52) U.S. Cl. .................................... 382/128; 382/131
(58) Field of Classification Search .............. 382/128, 382/131, 132, 173, 174
See application file for complete search history.

(56) References Cited

U.S. PATENT DOCUMENTS

| 5,361,763 | A  | * | 11/1994 | Kao et al. ................... 600/410 |
| 6,961,454 | B2 |   | 11/2005 | Jolly |
| 6,985,612 | B2 | * | 1/2006  | Hahn ............................ 382/128 |
| 7,087,022 | B2 |   | 8/2006  | Chalana et al. |
| 7,724,929 | B2 | * | 5/2010  | Shen ............................ 382/128 |
| 7,760,941 | B2 | * | 7/2010  | Bornemann et al. .......... 382/173 |
| 7,936,922 | B2 | * | 5/2011  | Berger ........................... 382/173 |
| 8,018,456 | B2 | * | 9/2011  | Blumhofer et al. .......... 345/423 |
| 2006/0228009 | A1 |   | 10/2006 | Fidrich et al. |
| 2007/0036417 | A1 |   | 2/2007  | Argiro et al. |

OTHER PUBLICATIONS

Aboutanos et al., "Automatic brain segmentation and validation: image-based versus atlas-based deformable models," Proc. SPIE, 3034: 299-310, (1997).
Angelie et al., "Optimizing the automatic segmentation of the left ventricle in magnetic resonance images," Med. Phys., 32 (2): 369-375 (2005).
Bae et al., "Automatic segmentation of liver structure in CT images," Med. Phys., 20; 71-78 (1993).
Bardinet et al., "A parametric deformable model to fit unstructured 3D data," Comput. Vis. Image Underst., 71: 39-54 (1998).
Besag, "On statistical analysis of dirty pictures," CVGIP: Image Underst., 57: 359-372 (1986).
Bezdek et al., "Review of MR image segmentation techniques using pattern recognition," Med. Phys., 20: 1033-1048 (1993).
Boudraa et al., "Automated detection of the left ventricular region in gated nuclear cardiac imaging," IEEE Trans. Biomed. Eng., 43 (3): 430-437 (1996).
Boudraa et al., "Automated detection of the left ventricular region in magnetic resonance images by fuzzy c-means model," Int. J. Card. Imaging, 13: 347-355 (1997).

(Continued)

*Primary Examiner* — Louis Arana
(74) *Attorney, Agent, or Firm* — Leydig, Voit & Mayer, Ltd.

(57) ABSTRACT

A method for identifying an attribute of an object represented in an image comprising data defining a predetermined spatial granulation for resolving the object, where the object is in contact with another object. In an embodiment, the method comprises identifying data whose values indicate they correspond to locations completely within the object, determining a contribution to the attribute provided by the data, and identifying additional data whose values indicate they are not completely within the object. The method next interpolates second contributions to the attribute from the values of the additional data and finds the attribute of the object from the first contribution and second contributions. The attribute may be, for example, a volume, and the values may correspond, for example, to intensity.

11 Claims, 26 Drawing Sheets

OTHER PUBLICATIONS

Brinkman et al., "Optimized homomorphic unsharp masking for MR grayscale inhomogeneity correction," IEEE Trans. Med. Imaging, 17: 161-171 (1998).
Caselles et al., "A geometric model for active contours," Numer. Math., 66: 1-31 (1993).
Chalana et al., "A methodology for evaluation of boundary detection algorithms on medical images," IEEE Trans. Med. Imaging, 16: 642-652 (1997).
Chen et al., "On digital mammogram segmentation and microcalcification detection using multiresolution wavelet analysis," Graph. Models Image Process., 59: 349-364 (1997).
Chen et al., "Shape statistics variational approach for the outer contour segmentation of left ventricle MR images," IEEE Trans. Inf. Technol. Biomed., 10 (3): 588-597 (2006).
Cheng et al., "A novel approach to microcalcification detection using fuzzy logic technique," IEEE Trans. Med. Imaging, 17: 442-450 (1998).
Choi et al., "Partial volume tissue classification of multi-channel magnetic resonance images—a mixel model," IEEE Trans. Med. Imaging, 10: 395-407 (1991).
Christensen et al., "Volumetric transformation of brain anatomy," IEEE Trans. Med. Imaging, 16: 864-877 (1997).
Clark, "Neural network modeling," Phys. Med. Biol., 36: 1259-1317 (1991).
Clarke et al., "MRI segmentation: methods and applications," Magn. Reson. Imaging, 13 (3): 343-368 (1995).
Codella et al., "Partial voxel segmentation of the left ventricle," U.S. Appl. No. 60/931,126 (May 21, 2007).
Codella et al., "Partial voxel segmentation of the left ventricle," U.S. Appl. No. 61/066,217 (Feb. 19, 2008).
Cohen, "On active contour models and balloons," CVGIP: Image Understanding, 53: 211-218 (1991).
Coleman et al., "Image segmentation by clustering," Proc. IEEE Trans. Med. Imaging, 5: 773-785 (1979).
Collins et al., "Automatic 3-D model-based neuroanatomical segmentation," Hum. Brain Mapp., 3: 190-208 (1995).
Collins et al., "Design and construction of a realistic digital brain phantom," IEEE Trans. Med. Imaging, 17: 463-468 (1998).
Corsi et al., "Computerized quantification of left ventricular volumes on cardiac magnetic resonance images by level set method," International Congress Series, 1268: 1114-1119 (2004).
Davatzikos et al., "Spatial normalization of 3D images using deformable models," J. Comput. Assist. Tomogr., 20: 656-665 (1996).
Davatzikos et al., "Using a deformable surface model to obtain a shape representation of the cortex," IEEE Trans. Med. Imaging, 15: 785-795 (1996).
Davenport et al., "Parameter estimation for finite mixture distributions," Comput. Math. Appl., 15: 810-828 (1988).
Dawant et al., "Correction of intensity variations in MR images for computer-aided tissue classification," IEEE Trans. Med. Imaging, 12: 770-781 (1993).
Dewey et al., "Evaluation of global and regional left ventricular function with 16-slice computed tomography, biplane cineventriculography, and two-dimensional transthoracic echocardiography: comparison with magnetic resonance imaging," J. Am. Coll. Cardiol., 48 (10): 2034-2044 (2006).
Fosgate et al., "Multiscale segmentation and anomaly enhancement of SAR imagery," IEEE Trans. Image Process., 6: 7 20 (1997).
Ge et al., "Accurate localization of cortical convolutions in MR brain images," IEEE Trans. Med. Imaging, 15: 418-428 (1996).
Gelenbe et al., "Neural network methods for volumetric magnetic resonance imaging of the human brain," Proc. IEEE, 84: 1488-1496 (1996).
Geman et al., "Stochastic relaxation, Gibbs distributions, and the Bayesian restoration of images," IEEE Trans. Pattern Anal. Mach. Intell., 6: 721-741 (1984).
Gibbs et al., "Tumour volume detection from MR images by morphological segmentation," Phys. Med. Biol., 41: 2437-2446 (1996).
Gonzalez et al., "A brief overview of linear systems," in Digital Image Processing, Chapter 3, 33-37 (Prentice Hall, Upper Saddle River, NJ, 1992).
Gonzalez et al., "A brief review of matrices and vectors," in Digital Image Processing, Chapter 1, 1-12 (Prentice Hall, Upper Saddle River, NJ, 1992).
Gonzalez et al., "A brief review of probability and random variables," in Digital Image Processing, Chapter 2, 13-31 (Prentice Hall, Upper Saddle River, NJ, 1992).
Gordon et al., "In vivo assessment of trabecular bone structure at the distal radius from high-resolution computed tomography images," Phys. Med. Biol., 41: 495-508 (1996).
Grimson et al., "Utilizing segmented MRI data in image-guided surgery," Int. J. Pattern Recognit. Artif Intell., 11: 1367-1397 (1997).
Grothues et al., "Comparison of interstudy reproducibility of cardiovascular magnetic resonance with two-dimensional echocardiography in normal subjects and in patients with heart failure or left ventricular hypertrophy," Am. J. Cardiol., 90 (1): 29-34 (2002).
Hall et al., "A comparison of neural network and fuzzy clustering techniques in segmenting magnetic resonance images of the brain," IEEE Trans. Neural Netw., 3: 672-682 (1992).
Haralick et al., "Image segmentation techniques," Comput. Vis. Graph. Image Proc., 29: 100-132 (1985).
Hebert, "Fast iterative segmentation of high resolution medical images," IEEE Trans. Nucl. Sci., 44: 1363-1367 (1997).
Held et al., "Markov random field segmentation of brain MR images," IEEE Trans. Med. Imaging, 16 (6): 878-886 (1997).
Herndon et al., "Quantification of white matter and gray matter volumes from T1 parametric images using fuzzy classifiers," J. Magn. Reson. Imaging, 6: 425-435 (1996).
Hudsmith et al., "Normal human left and right ventricular and left atrial dimensions using steady state free precession magnetic resonance imaging," J. Cardiovasc. Magn. Reson., 7 (5): 775-782 (2005).
Illingworth et al., "A survey of the Hough transform," Comput. Vision Graph., 44 (1): 87-116 (1988).
Jolly, "Automatic segmentation of the left ventricle in cardiac MR and CT images," Int. J. Comput. Vision, 70 (2): 151-163 (2006).
Joshi et al., "On the geometry and shape of brain submanifolds," Int. J. Pattern Recognit. Artif. Intell., 11: 1317-1343 (1997).
Kapur et al., "Enhanced spatial priors for segmentation of magnetic resonance imagery," in Medical Image Computing and Computer-Assisted Intervention—MICCAI'98, 457-468 (Springer-Verlag, Berlin, Germany, 1998).
Kaus et al., "Automated segmentation of the left ventricle in cardiac MRI," Med. Image Anal., 8 (3): 245-254 (2004).
Khaneja et al., "Dynamic programming generation of curves on brain surfaces," IEEE Trans. Pattern Anal. Mach. Intell., 20:1260-1265 (1998).
Khoo et al., Magnetic resonance imaging (MRI): considerations and applications in radiotheraphy treatment planning,: Radiother. Oncol., 42: 1-15 (1997).
Lancaster et al., "Automated labeling of the human brain: a preliminary report on the development and evaluation of a forward-transform method," Hum. Brain Mapp., 5: 238-242 (1997).
Langan et al., "Cluster validation for unsupervised stochastic model-based image segmentation," IEEE Trans. Image Process., 7: 180-195 (1998).
Larie et al., "Brain abnormality in schizophrenia: a systematic and quantitative review of volumetric magnetic resonance imaging studies," J. Psychol., 172: 110-120 (1998).
Lee et al., "Unsupervised connectivity-based thresholding segmentation of midsaggital brain MR images," Comput. Biol. Med., 28: 309-338 (1998).
Lei et al., "Statistical approach to X-ray CT imaging and its applications in image analysis. II. A new stochastic model-based image segmentation technique for X-ray CT image," IEEE Trans. Med. Imaging, 11 (1): 62-69 (1992).
Li et al., "Markov random field for tumor detection in digital mammography," IEEE Trans. Med. Imaging, 14: 565-576 (1995).
Liang et al., "Parameter estimation and tissue segmentation from multispectral MR images," IEEE Trans. Med. Imaging, 13: 441-449 (1994).
Liang, "Tissue classification and segmentation of MR images," IEEE Eng. Med. Biol., 12: 81-85 (1993).

Lynch et al., "Automatic segmentation of the left ventricle cavity and myocardium in MRI data," Comput. Bio. Med., 36 (4): 389-407 (2006).

Lynch et al., "Left-ventricle myocardium segmentation using a coupled level-set with a priori knowledge," Comput. Med. Imag. Grap., 30: 255-262 (2006).

Maintz et al., "A survey of medical image registration," Med. Image Anal., 2: 1-36 (1998).

Malladi et al., "Shape modeling with front propagation: a level set approach," IEEE Trans. Pattern Anal. Mach. Intell., 17:158-175 (1995).

Mangin et al., "From 3D magnetic resonance images to structural representations of the cortex topography using topology preserving deformations," J. Math. Imaging Vis., 5: 297-318 (1995).

Manousakas et al., "Split-and-merge segmentation of magnetic resonance medical images: performance evaluation and extension to three dimensions," Comput. Biomed. Res., 31: 393-412 (1998).

McInerney et al., "Deformable models in medical image analysis: a survey," Med. Image Anal., 1:91-108 (1996).

McInerney et al., "Medical image segmentation using topologically adaptable surfaces," in Proc. CVRMed'97, 1205: 23-32 (1997).

McInerney et al., "Topologically adaptable snakes," in Proc. Fifth International Conference on Computer Vision (ICCV'95), 840-845 (Jun. 20-23, 1995).

Meyer et al., "Retrospective correction of intensity inhomogeneities in MRI," IEEE Trans. Med. Imaging, 14: 36-41 (1995).

Mikic et al., "Segmentation and tracking in echocardiographic sequences: active contours guided by optical flow estimates," IEEE Trans. Med. Imaging, 17: 274-284 (1998).

Moss et al., "Prophylactic implantation of a defibrillator in patients with myocardial infarction and reduced ejection fraction," N. Engl. J. Med., 346 (12): 877-883 (2002).

Neumann et al., "Statistical shape model based segmentation of medical images," Comput. Med. Image Graph., 22: 133-143 (1998).

Niessen et al., "Geodesic deformable models for medical image analysis," IEEE Trans Med Imaging, 17 (4): 634-641 (1998).

Pal et al., "A review on image segmentation techniques," Pattern Recognit., 26: 1277-1294 (1993).

Papavassiliu et al., "Effect of endocardial trabeculae on left ventricular measurements and measurement reproducibility at cardiovascular MR imaging," Radiology, 236 (1): 57-64 (2005).

Pappas, "An adaptive clustering algorithm for image segmentation," IEEE Trans. Signal Process., 40: 901-914 (1992).

Paragios, "A level set approach for shape-driven segmentation and tracking of the left ventricle," IEEE Trans. Med. Imaging, 22 (6): 773-776 (2003).

Pathak et al., "Pubic arch detection in transrectal ultrasound guided prostate cancer therapy," IEEE Trans. Med. Imaging, 17: 762-771 (1998).

Pednekar et al., "Automated left ventricle segmentation in cardiac MRI," IEEE Trans. Biomed. Eng., 53 (7): 1425-1428 (2006).

Pednekar et al., "Automatic identification of the left ventricle in cardiac cine-MR images: dual-contrast cluster analysis and scout-geometry approaches," J. Magn. Reson. Imaging, 23 (5): 641-651 (2006).

Pham et al., "An adaptive fuzzy c-means algorithm for image segmentation in the presence of intensity inhomogeneities," Pattern Recognit. Lett., 20: 57-68 (1999).

Pham et al., "An automated technique for statistical characterization of brain tissues in magnetic resonance imaging," Int. J. Pattern Recognit. Artif. Intell., 11(8): 1189-1211 (1997).

Pham et al., "Current methods in medical image segmentation," Annu Rev Biomed Eng, 2: 315-337 (2000).

Pohlman et al., "Quantitative classification of breast tumors in digitized mammograms," Med. Phys., 23: 1337-1345 (1996).

Polakowski et al., "Computer-aided breast cancer detection and diagnosis of masses using difference of Gaussians and derivative-based feature saliency," IEEE Trans. Med. Imaging, 16: 811-819 (1997).

Priebe et al., "Segmentation of random fields via borrowed strength density estimation," IEEE Trans. Pattern Anal. Mach. Intell., 19: 494-499 (1997).

Rademacher et al., "Human cerebral cortex: localization, parcellation and morphometry with magnetic resonance imaging," J. Cogn. Neurosci., 4: 352-374 (1992).

Rajapakse et al., "Statistical approach to segmentation of single-channel cerebral MR images," IEEE Trans. Med. Imaging, 16: 176-186 (1997).

Rajarethinam et al., "Automatic atlas-based volume estimation of human brain regions from MR images," J. Comput. Assist. Tomogr., 20: 98-106 (1996).

Reddick et al., "Automated segmentation and classification of multispectral magnetic resonance images of brain using artificial neural networks," IEEE Trans. Med. Imaging, 16: 911-918 (1997).

Sahoo et al., "A survey of thresholding techniques," Comput. Vis. Graph. Image Proc., 41: 233-60 (1988).

Sandor et al., "Surface-based labeling of cortical anatomy using a deformable atlas," IEEE Trans. Med. Imaging, 16: 41-54 (1997).

Santarelli et al., "Automated cardiac MR image segmentation: theory and measurement evaluation," Med Eng Phys, 25 (2): 149-159 (2003).

Sievers et al., "Impact of papillary muscles in ventricular volume and ejection fraction assessment by cardiovascular magnetic resonance," J. Cardiovasc. Magn. Reson., 6 (1): 9-16 (2004).

Sijbers et al., "Watershed-based segmentation of 3D MR data for volume quantization" Magn. Reson. Imag., 15: 679-688 (1997).

Simmons et al., "Sources of intensity nonuniformity in spin echo images at 1.5T," Magn. Reson. Med., 32: 121-128 (1994).

Singleton et al., "Automatic cardiac MR image segmentation using edge detection by tissue classification in pixel neighborhoods," Magn. Reson. Med., 37: 418-424 (1997).

Sled et al., "A nonparametric method for automatic correction of intensity nonuniformity in MRI data," IEEE Trans. Med. Imaging, 17: 87-97 (1998).

Sled et al., "Standing-wave and RF penetration artifacts caused by elliptic geometry: an electrodynamic analysis of MRI," IEEE Trans. Med. Imaging, 17: 653-662 (1998).

Solomon et al., "Influence of ejection fraction on cardiovascular outcomes in a broad spectrum of heart failure patients," Circulation, 112 (24): 3738-3744 (2005).

Suri, "Computer vision pattern recognition and image processing in left ventricle segmentation: the last 50 years," Pattern Anal. Appl, 3: 209-242 (2000).

Taylor, "Invited review: computer aids for decision-making in diagnostic radiology—a literature review," Br. J. Radiol., 68: 945-957 (1995).

Thompson et al., "Detection, visualization and animation of abnormal anatomic structure with a probabilistic brain atlas based on random vector field transformations," Med. Image Anal., 1: 271-294 (1997).

Udupa et al., "Fuzzy connectedness and object definition: theory, algorithms and applications in image segmentation," Graph. Models Image Process., 58:246-261 (1996).

Vaidyanathan et al., "Comparison of supervised MRI segmentation methods for tumor volume determination during therapy," Magn. Reson. Imaging, 13: 719-728 (1995).

Van Der Geest et al., "Automated detection of left ventricular epi- and endocardial contours in short-axis MR images," Computers in Cardiology, Bethesda, MD, pp. 33-36 (Sep. 25-28, 1994).

Van Der Geest et al., "Comparison between manual and semiautomated analysis of left ventricle volume parameters from short-axis MR images," J. Comput. Assist. Tomogr., 21 (5): 756-765 (1997).

Van Der Geest et al., "Evaluation of a new method for automated detection of left ventricular boundaries in time series of magnetic resonance images using an Active Appearance Motion Model," J. Cardiovasc. Magn. Reson., 6 (3): 609-617 (2004).

Van Geuns et al., "Automatic quantitative left ventricular analysis of cine MR images by using three-dimensional information for contour detection," Radiology, 240 (1): 215-221 (2006).

Vannier et al., "Multispectral analysis of magnetic resonance images," Radiology, 154: 221-224 (1985).

Vilarino et al., "Discrete-time CNN for image segmentation by active contours," Pattern Recognit. Lett., 19: 721-734 (1998).

Vincent et al., "Watersheds in digital spaces: an efficient algorithm based on immersion simulation," IEEE Trans. Pattern Anal. Mach. Intell., 13: 583-598 (1991).

Waiter et al., "Determination of normal regional left ventricular function from cine-MR images using a semi-automated edge detection method," Magn. Reson. Imaging, 17: 99-107 (1999).

Wells et al., "Adaptive segmentation of MRI data," IEEE Trans. Med. Imaging, 15: 429-442 (1996).

Worth et al., "Neuroanatomical segmentation in MRI: technological objectives," Int. J. Pattern Recognit. Artif. Intell., 11: 1161-1187 (1997).

Wust et al., "Evaluation of segmentation algorithms for generation of patient models in radiofrequency hyperthermia," Phys. Med. Biol, 43: 3295-3307 (1998).

Xu et al., "Reconstruction of the central layer of the human cerebral cortex from MR images," in Proc. Int. Conf. Med. Image Comput. Comp. Assist. Interv., 1st, Cambridge, MA, 482-488 (1998).

Xu et al., "Snakes, shapes, and gradient vector flow," IEEE Trans. Image Processing, 7 (3): 359-369 (1998).

Zadeh, "Fuzzy sets," Inf. Control, 8: 338-353 (1965).

Zhang, "A survey of evaluation methods for image segmentation," Pattern Recognit. Lett., 29: 1335-1346 (1996).

Zhou et al., "Cardiac MR image segmentation and left ventricle surface reconstruction based on level set method," Stud. Health Technol. Inform., 111: 629-632 (2005).

Zijdenbos et al., "Brain segmentation and white matter lesion detection in MR images," Crit. Rev. Biomed. Eng., 22: 401-465 (1994).

* cited by examiner

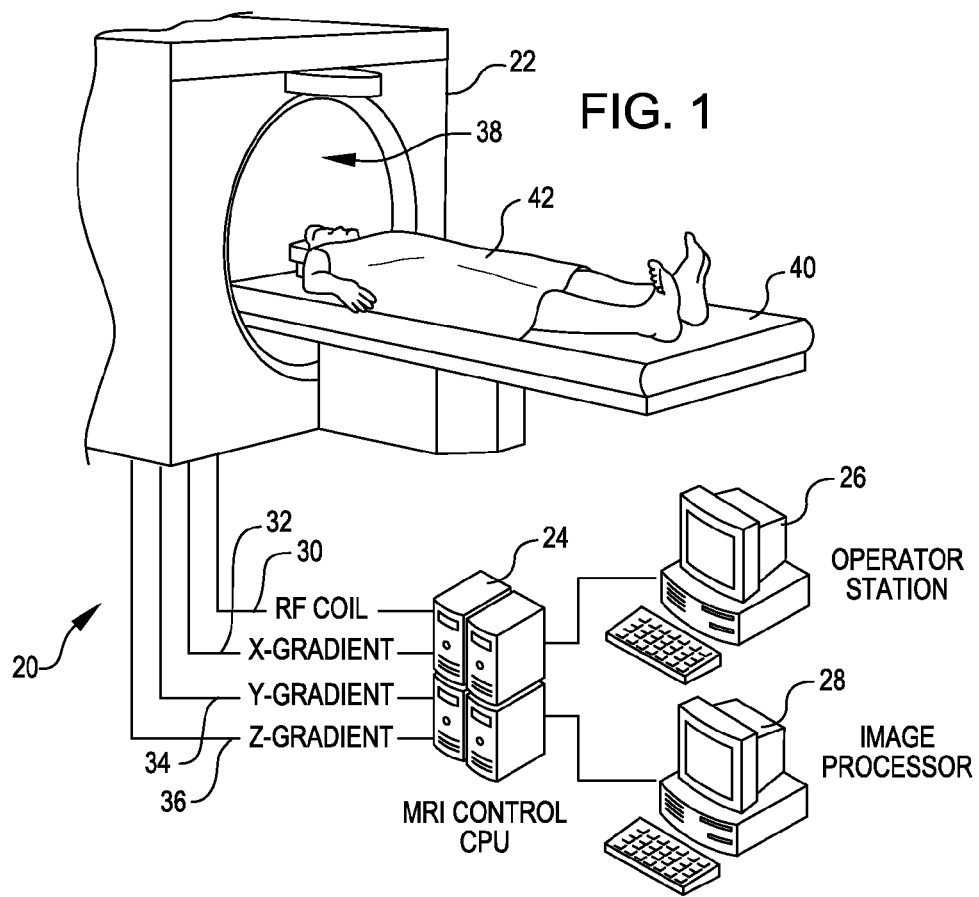
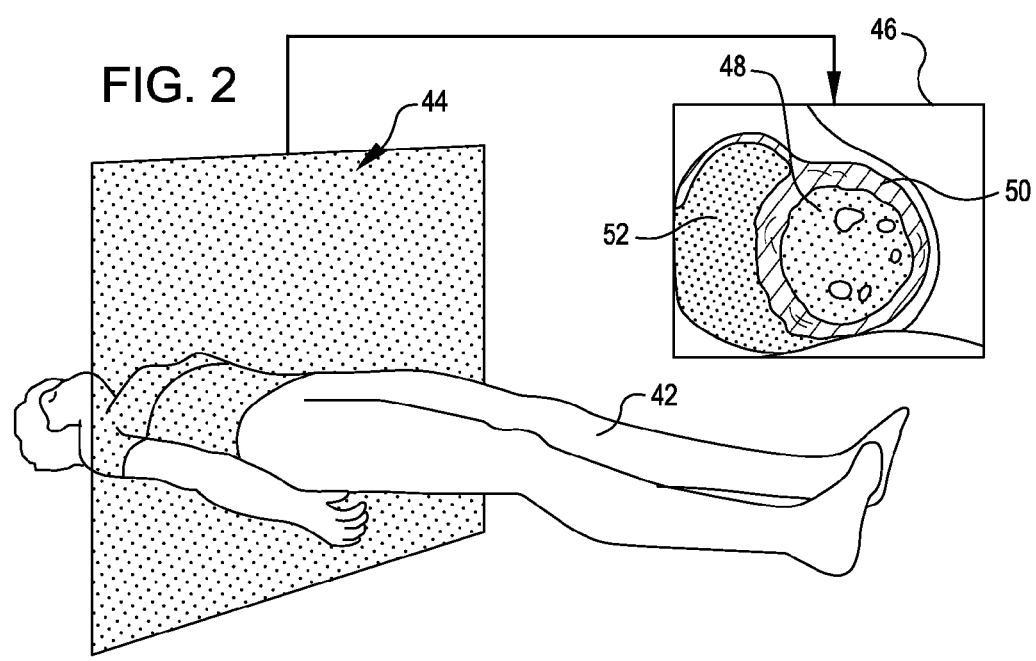

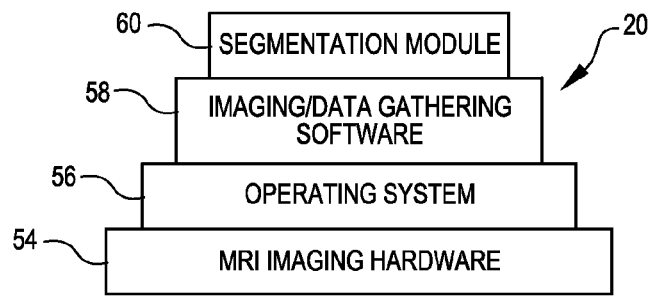
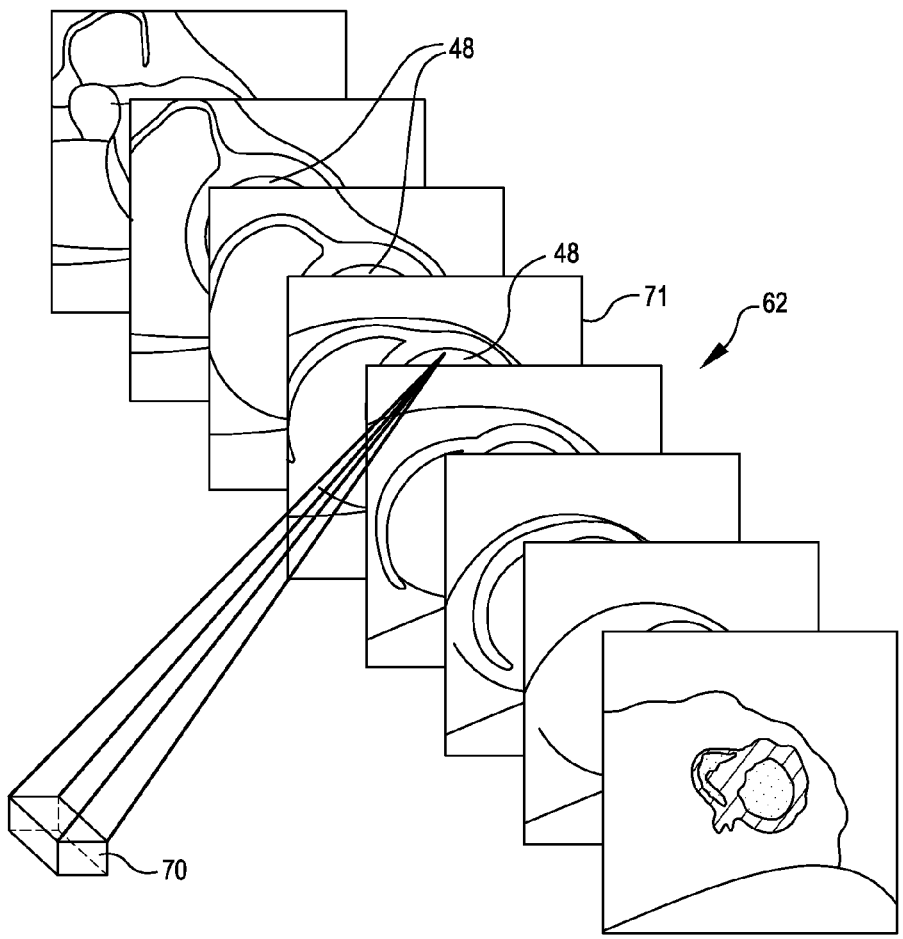

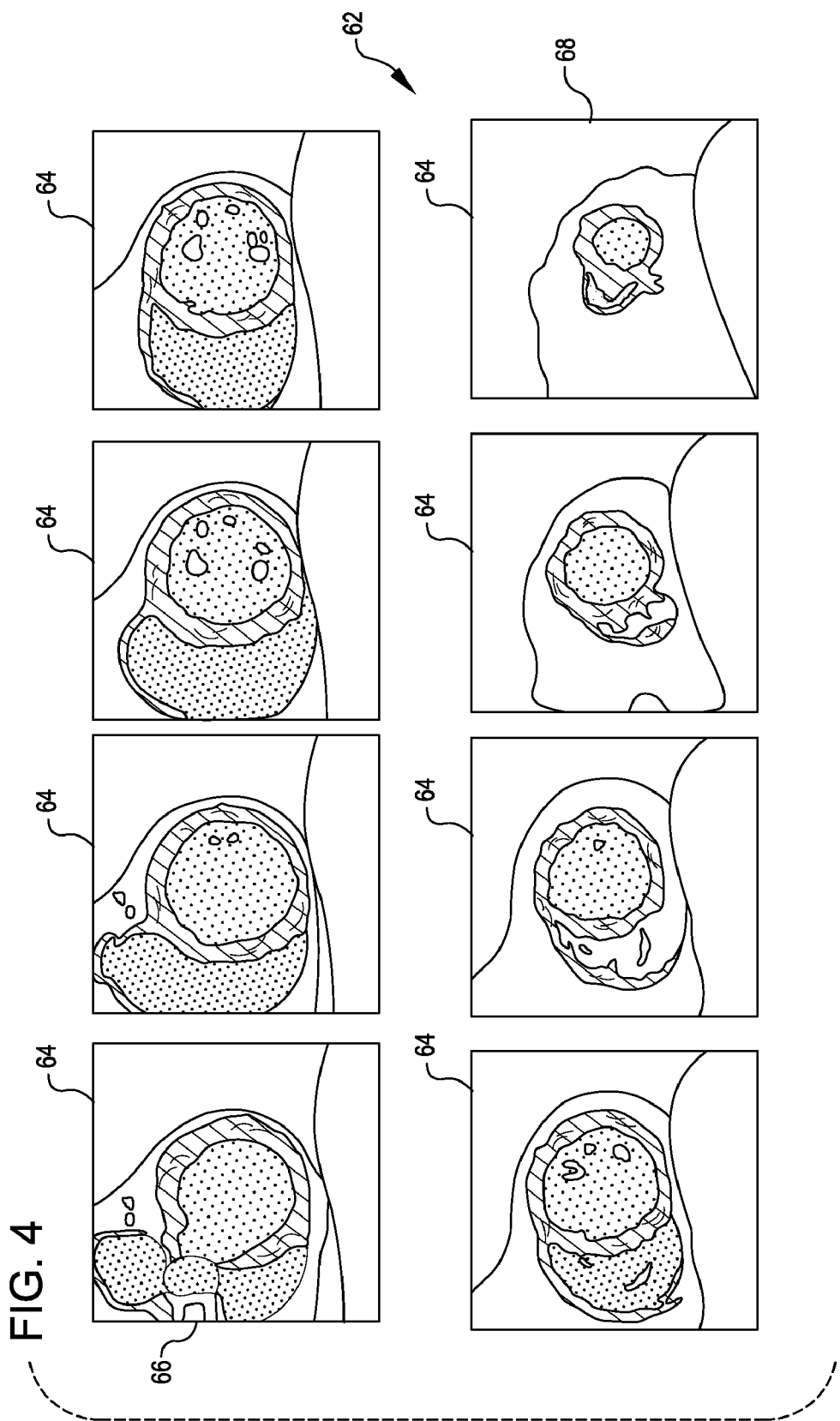

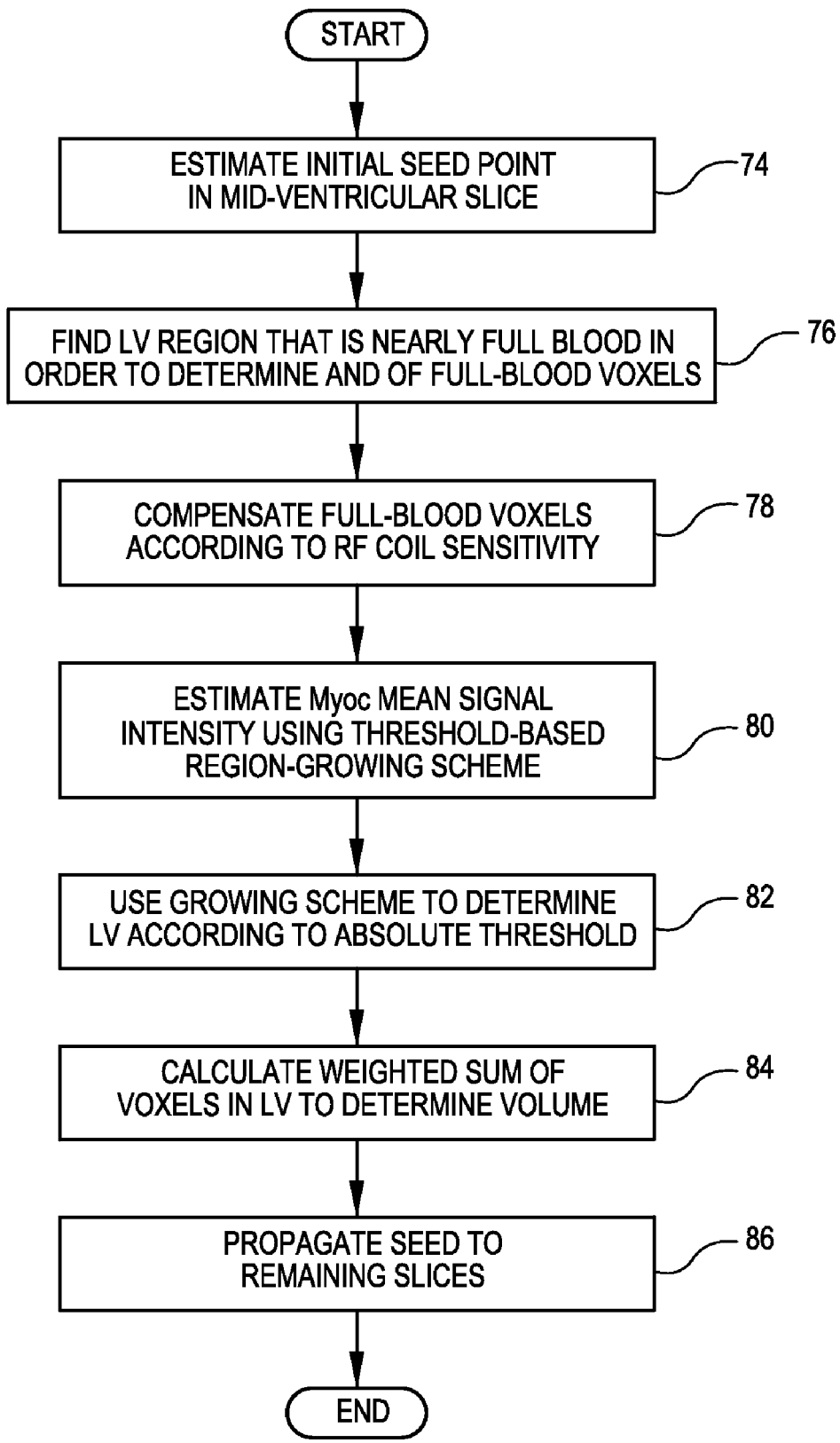

|  | Manual | PVS | P (T < t) | Relative Difference | % Vol. from Partial Vox. |
|---|---|---|---|---|---|
| Diastolic Volume | 152.1 ± 55.1 | 127.4 ± 48.4 | 4.92E-10 | 16.5 ± 5.9 | 18.3 ± 6.9 |
| Systolic Volume | 72.1 ± 52.4 | 57.9 ± 45.5 | 1.18E-08 | 22 ± 6.9 | 22.3 ± 9.6 |
| Ejection Fraction | 56.8 ± 15.6 | 59.1 ± 16.6 | 1.11E-04 | -3.9 ± 4.2 | |

FIG. 15

| | Manual (Method 1) | Manual (Method 2) | PVS | P (T < t) (Method 1) | P (T < t) (Method 2) | Relative Difference (Method 1) | Relative Difference (Method 2) | % Vol. from Partial Vox. |
|---|---|---|---|---|---|---|---|---|
| Diastolic Volume | 141.9 ± 41.1 | 136.5 ± 40.1 | 113.1 ± 32.7 | 2.18E-09 | 1.23E-08 | 20.4 ± 3.7 | 17.2 ± 3.7 | 19.6 ± 3.3 |
| Systolic Volume | 50.1 ± 20.8 | 44 ± 19.6 | 32.9 ± 15.9 | 2.88E-09 | 6.34E-08 | 35.7 ± 7.1 | 26 ± 6.7 | 25.4 ± 6.6 |
| Ejection Fraction | 65.4 ± 7.2 | 68.6 ± 7.4 | 71.9 ± 6.9 | 5.87E-08 | 8.92E-05 | -10.3 ± 5.6 | -5.1 ± 4.8 | |

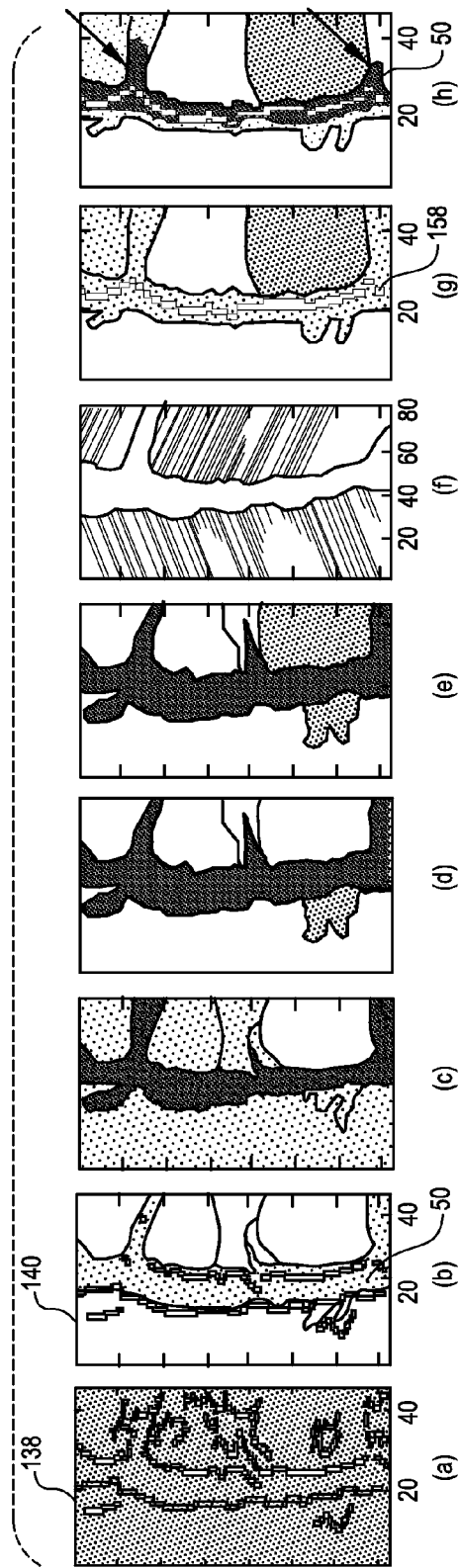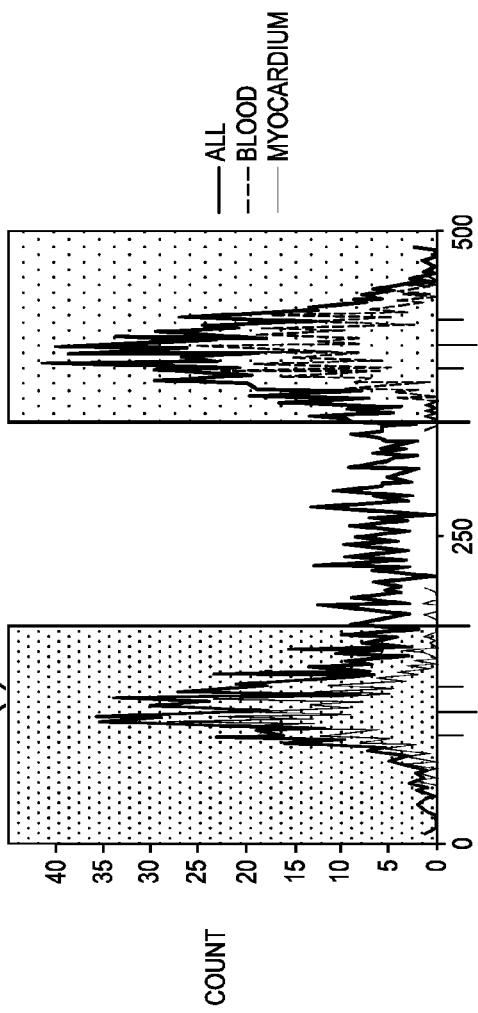
FIG. 19

FIG. 21

| | Manual tracing- lvGIGA (Partial volume) | | | Manual tracing- lvGIGA (Partial volume) | | | Manual tracing- MASS software | | |
|---|---|---|---|---|---|---|---|---|---|
| | Absolute | Relative | Corr. | Absolute | Relative | Corr. | Absolute | Relative | Corr. |
| Blood diastolic volume | -2.3 ± 5.2 (mL) | -1.7 ± 4.3 (%) | $R^2 = 0.99$ | 19.6 ± 87 (mL) | 13.8 ± 45 (%) | $R^2 = 0.98$ | -20.0 ± 6.9 (mL) | -14.3 ± 3.3 (%) | $R^2 = 0.99$ |
| Blood systolic volume | -3.6 ± 3.4 (mL) | -8.1 ± 7.8 (%) | $R^2 = 0.99$ | 10.0 ± 63 (mL) | 17.7 ± 62 (%) | $R^2 = 0.99$ | -12.7 ± 8.5 (mL) | 23.1 ± 10.1 (%) | $R^2 = 0.99$ |
| Ejection fraction | 2.1 ± 2.2 (%) | 3.5 ± 4.1 (%) | $R^2 = 0.98$ | 3.5 ± 4.1 (%) | -2.7 ± 3.5 (%) | $R^2 = 0.98$ | 2.6 ± 2.7 (%) | 4.5 ± 4.5 (%) | $R^2 = 0.97$ |
| Epicardial volume | - 11.4 ± 10.8 (mL) | -4.8 ± 3.7 (%) | $R^2 = 0.99$ | - | - | - | 21.0 ± 20.8 (mL) | -7.7 ± 5.6 (%) | $R^2 = 0.96$ |
| Myocardial mass | -9.6 ± 13.0 (g) | 9.2 ± 10.8 (%) | $R^2 = 0.93$ | - | - | - | -1.0 ± 20.2 (g) | 0.0 ± 12.3 (%) | $R^2 = 0.88$ |

| | | lvGIGA algorithm | MASS software |
|---|---|---|---|
| Endocardial | Basal slices | 22/635, 3.5% (17/38, 44.7%) | 32/635, 5.0% (24/38, 63.2%) |
| | Other slices | 4/635, 0.6% (3/38, 7.9%) | 67/635, 10.6% (28/38, 73.7%) |
| Epicardial | Additional slices | 13/339, 3.8% (8/38, 21.1%) | 175/339, 51.6% (38/38, 100.0%) |

FIG. 31

| | Manual tracing- ITHACA algorithm | | | Manual tracing - MASS software | | |
|---|---|---|---|---|---|---|
| | Absolute | Relative | Corr. | Absolute | Relative | Corr. |
| Endocardial volume | 2.9 ± 6.2 (mL) | 1.8 ± 4.5 (%) | $R^2 = 0.99$ | -20.0 ± 6.9 (mL) | -14.3 ± 3.3 (%) | $R^2 = 0.99$ |
| Epicardial volume | 2.0 ± 13.0 (mL) | 0.5 ± 4.1 (%) | $R^2 = 0.98$ | -21.0 ± 20.8 (mL) | -7.7 ± 5.6 (%) | $R^2 = 0.96$ |
| Endocardial volume | -0.9 ± 16.5 (g) | -1.5 ± 11.9 (%) | $R^2 = 0.90$ | -1.0 ± 20.2 (g) | 0.0 ± 12.3 (%) | $R^2 = 0.88$ |

|  |  | ITHACA algorithm | MASS software |
|---|---|---|---|
| Endocardial contour | Basal slices | 16/339, 4.7% (16/38, 42.1%) | 17/339, 5.0% (17/38, 44.7%) |
|  | Other slices | 0/339, 0% (0/38 0%) | 36/339, 10.6% (28/38, 73.6%) |
| Endocardial contour | Additional slices | 5/339, 1.5% (5/38, 13.1%) | 175/339, 51.6% (38/38, 100.0%) |

METHOD FOR SEGMENTING OBJECTS IN IMAGES

CROSS-REFERENCE TO RELATED APPLICATIONS

This patent application claims the benefit of U.S. Provisional Patent Application No. 60/931,126, filed May 21, 2007, and U.S. Provisional Patent Application No. 61/066,217, filed Feb. 19, 2008, which are herein incorporated by reference in their entireties with no exclusion of any part thereof.

FIELD OF THE INVENTION

The invention relates generally to the analysis of image data and more particularly to extracting attributes of objects represented in image data from the image data.

BACKGROUND OF THE INVENTION

Cardiac disease is the leading cause of death in the developed world. In an attempt to decrease cardiac fatalities and improve quality of life, a variety of diagnostic procedures have been developed for proactively diagnosing and treating cardiac conditions. In particular, various indicators of heart function are measured and reviewed in order to gain a better understanding of heart function, disorders, and the effects of various forms of treatment. The study of the left ventricle has become particularly important in this regard since the left ventricle is the portion of the heart that pushes oxygen-rich blood to the aorta for distribution throughout the body. Consequently, images and metrics of the left ventricle and left ventricular function provide valuable information concerning cardiac health.

For example, left ventricular stroke volume, i.e., the volume of blood pumped by the left ventricle through the aortic valve into the aorta, is an important clinical indicator for diagnosing cardiovascular disease and for monitoring the effects of treatment. The left ventricular ejection fraction, i.e., the ratio of the amount of blood in the left ventricle before a contraction to the amount of blood after a contraction, likewise provides important information to medical providers about the heart's function and the effect of therapy. The characteristics of the myocardium, which is a structure surrounding the left ventricle, may also provide important indicators of heart function. Imaging techniques can be used to study and evaluate the myocardium by ascertaining myocardial mass, myocardial thickness, and other characteristics.

Various existing imaging systems can provide detailed images of the heart. For example, magnetic resonance imaging (MRI), computed tomography (CT), ultrasound, X-ray, and single photon emission computed tomography (SPECT) are all able to provide images of the heart. Many of these systems can produce three-dimensional images of their subjects, not only capturing the surface of the subject, but gathering details throughout the subject's interior.

An image can be viewed as a collection of units called "voxels." A voxel is a building block that corresponds to a particular region of the image and includes information about the image such as color, intensity, and/or other characteristics. Because any imaging device does not have infinite precision, a voxel approximates the characteristics of the location in the subject which it represents. For example, while the area represented by a voxel may be shown to vary in intensity, an imaging device which cannot resolve smaller details may assign the voxel an intensity equal to what the imaging device measures over the entire area, such as the mean intensity of the area.

A voxel can have any number of dimensions, but typically has two, three, or four and each dimension can be spatial, temporal, or of another characteristic. In two spatial dimensions, a voxel is commonly known as a pixel and corresponds to a rectangular area of a two-dimensional image, the rectangular area typically corresponding to the smallest area able to be scanned by an imaging device, either because of internal settings or because of physical limitations, or the smallest area able to be displayed by a device for displaying the image. While a pixel represents a rectangular area of the subject, it may be displayed as a dot on a screen or paper or other display device. In three spatial dimensions, a voxel generally corresponds to a rectangular prism-shaped portion of the subject. Voxels can also include time dimensions if an imaging device scans a subject over a period of time.

Generally, three-dimensional images are made up of a composite of slices, each of which is a spatially two-dimensional image of a cross section of the subject. Typically, the slices are parallel and spaced a short distance apart so that the slices together form a reasonable approximation of the subject. A voxel in a three-dimensional image often has a length, measured normal to the slice, corresponding with the distance between consecutive slices. With a time dimension, each slice can comprise a series of frames, where a frame is the slice taken at a particular time, with a frame of a slice being similar in principle to a frame of a movie reel. Generally, the frames are captured with a short enough time between frames so that a reasonable representation of the subject over a time interval is achieved.

Multi-dimensional imaging gives medical providers a powerful tool as they are able to view the heart and the features of its interior over a period of time in order to view cardiac function in great detail. For instance, four-dimensional imaging allows medical providers to view a complete beat of a heart, from a diastole through a systole, in order to verify that the heart is functioning properly, to identify any problems or potential problems, or to determine whether drug or other therapy has had an effect.

In addition to the detailed images provided by various imaging systems, the images also allow medical providers to take important measurements relating to the subject. A radiologist or technician can review slices of the heart and trace the contours of a left ventricle or other structure, such as the myocardium, in each slice of the heart. Finding the area of the traced object in each slice allows estimation of the volume of the object as the distance between each slice is a known value. Moreover, when each slice comprises a series of frames, the volume can be watched over a period of time in order to determine important metrics, such as the ejection fraction discussed above. However, calculating the volume of an object in an image in this manner is very labor intensive as it requires a person to trace contours in each frame of each slice. Hand tracing also is subject to human error and physical limitations, especially if contours appearing in the image are not well defined or are too small to be seen without magnification.

Image processing systems have developed that allow automated and semi-automated analysis of image data provided from an imaging device. For instance, algorithms have been developed that are able to detect objects in an image, thereby reducing the amount of human intervention required for analysis of the image. For instance, algorithms for identifying the left ventricle in an image of a heart have been developed by which a person identifies a seed in the image, which is one or more points corresponding to blood in the left ventricle, and the algorithm grows a region from the seed by searching for similar points, such as points sharing a similar intensity. Often the algorithms start at the seed and grow outwardly, searching for neighboring points having an intensity or other attribute close to an intensity or other attribute of the seed. Points having similar characteristics are classified as corresponding to the left ventricle while points having dissimilar characteristics are classified as not corresponding to the left ventricle.

The intensity or other attributes of points in an image can also be used to locate other structures. For example, algorithms exist for identifying the outer (epicardial) border of the myocardium. Typically, these algorithms use one of several known schemes for detecting the myocardium, for example by using edge detection algorithms for finding the edge of the myocardium.

One method for identifying an epicardial border is through an active contour model (ACM). With an active contour model, a contour is strategically placed in an image, such as near an endocardial border. The initial contour is often a shape, such as a circle, corresponding to the general form of an object in the image. Initial contours can also be drawn in by hand. Gradients or other calculations based on the image are calculated and the contour is iteratively deformed according to the gradients until deformation of the contour ceases at the target border.

While they are generally helpful, existing methods for identifying and analyzing cardiac structures from image data have many disadvantages, and such disadvantages are often exacerbated by certain features of the heart. One such disadvantage is the inability of existing methods to accurately handle irregular structures. For example, the outer edge of the left ventricle at the basal or apical ends is often irregular in shape and does not have a generally circular outer edge as in mid-ventricular portions of the left ventricle. Existing methods also require significant user intervention in order to achieve a desirable level of accuracy. User intervention reduces the speed at which analysis can proceed, and also increases the associated personnel costs.

Moreover, existing methods characterize voxels as belonging to one structure or another, but do not take into account that a voxel may correspond to a region of a subject that contains part of more than one object, therefore causing inaccuracies in any related computations. For example, voxels at the outer surface of the left ventricle may correspond to a region of the heart containing both part of the left ventricle and part of the myocardium surrounding the left ventricle. A computation that assumes that such voxels correspond only to the left ventricle or only to the myocardium will be inaccurate. High accuracy measurements are crucial for diagnosing patients, especially those with actual or potential cardiomyopathy. Such conditions include heart failure, coronary artery disease, and poorly controlled high blood pressure (hypertension). Also, patients taking drugs with possible cardiotoxicities must be accurately measured. Cardiotoxic drugs include cancer drugs including anthracyclines, which in turn include doxorubicin. Other diseases and conditions may be cardiotoxic and may require careful monitoring of ejection fraction. Such diseases and conditions include: viral, bacterial, fungal, or parasitic infection; amyloidosis; chronic or long-term alcohol use; diabetes; thyroid disease, such as hyperthyroidism; thiamine and vitamin B deficiency; and genetic defects. Finally, existing methods are computationally intense, often requiring special hardware in order to perform all the necessary calculations in a reasonable amount of time.

BRIEF SUMMARY OF THE INVENTION

The invention provides a method for identifying an attribute of an object represented in an image comprising data defining a predetermined spatial granulation for resolving the object, where the object is in contact with another object. In an embodiment, the method comprises identifying data whose values indicate they correspond to locations completely within the object, determining a contribution to the attribute provided by the data, and identifying additional data whose values indicate they are not completely within the object. The method next interpolates second contributions to the attribute from the values of the additional data and finds the attribute of the object from the first contribution and second contributions. The attribute may be, for example, a volume, and the values may correspond, for example, to intensity.

In another embodiment, the method entails identifying one or more partial voxels located at an edge of the object and encompassing a portion of the object and a portion of said another object, and estimating an amount of the object encompassed by the one or more partial voxels using a first value of an attribute the one or more partial voxels.

In another embodiment, a method is provided for measuring the volume of an object in an image, the method comprising growing a test object starting at a seed voxel within the object, computing the volume of the test object based on a set of voxels having values of a common attribute close to a value of the seed voxel, and stopping the growth of the test object when a rate of expansion exceeds a predetermined value.

In yet another embodiment, a method is provided for measuring the volume of an object in an image comprising voxels, the object surrounding another object in the image and in contact with one or more other objects external to the object. The method comprises identifying an attribute of the object whose value is different from values of an attribute of the one or more other objects, and initializing a contour at an inner border of the object. The contour is then deformed and outwardly expanded until the contour passes substantially through a region of voxels characteristically similar to the object, thereby forming an outer border of the object and defining a space between the inner and outer borders that includes the region.

In another embodiment, the method for measuring the volume of the object entails identifying an attribute of the object whose value is different from values of a same or similar attribute of the one or more other objects, initializing a contour of the object that employs the attribute, and expanding the contour using the attribute until the contour passes substantially through a region of voxels characteristically similar to the object, thereby forming inner and outer borders of the object and defining a space between the inner and outer borders that includes the region. The contour is initialized at the inner border of the object and the expansion occurs outwardly from the contour in an embodiment of the invention. In an alternative embodiment of the invention, the contour is initialized at the outer border of the object and the expansion occurs inwardly from the contour.

In a further embodiment, a method for identifying an attribute of an object represented by imaging data, where the object contains a volume, comprises determining an initial value of the volume, determining inner and outer edges of the object using one or more values of one or more attributes of the imaging data, extracting the object using the inner and outer edges of the object, and determining a final value of the volume for the object by growing the volume from the initial value to the extracted object.

BRIEF DESCRIPTION OF THE SEVERAL VIEWS OF THE DRAWINGS

FIG. 1 is a schematic diagram showing an environment for obtaining and processing images, in accordance with an embodiment;

FIG. 2 is a schematic diagram demonstrating a correspondence between a slice of an image obtained in the environment of FIG. 1 and the origin of the slice;

FIG. 3 is a diagrammatic representation of an environment in which a segmentation module for segmenting objects in images obtained in the environment of FIG. 1 can operate;

FIG. 4 is a representation of an image obtained in the environment of FIG. 1;

FIG. 5 is a representation of the image of FIG. 4, demonstrating the origin of a voxel;

FIGS. 6 and 6(a) are flowcharts demonstrating a method for calculating the volume of a left ventricle in the image of FIG. 4, in accordance with an embodiment;

FIG. 15 is a table demonstrating results of various segmentation methods;

FIGS. 19(a) through 19(h) are a series of images demonstrating the method of FIG. 16;

FIG. 19(i) is a histogram of voxel intensities, in accordance with the method of FIG. 16;

FIG. 21 is a table demonstrating results of various segmenting methods;

FIG. 31 is a table demonstrating results of various segmenting methods;

DETAILED DESCRIPTION OF THE INVENTION

Figure 6A:
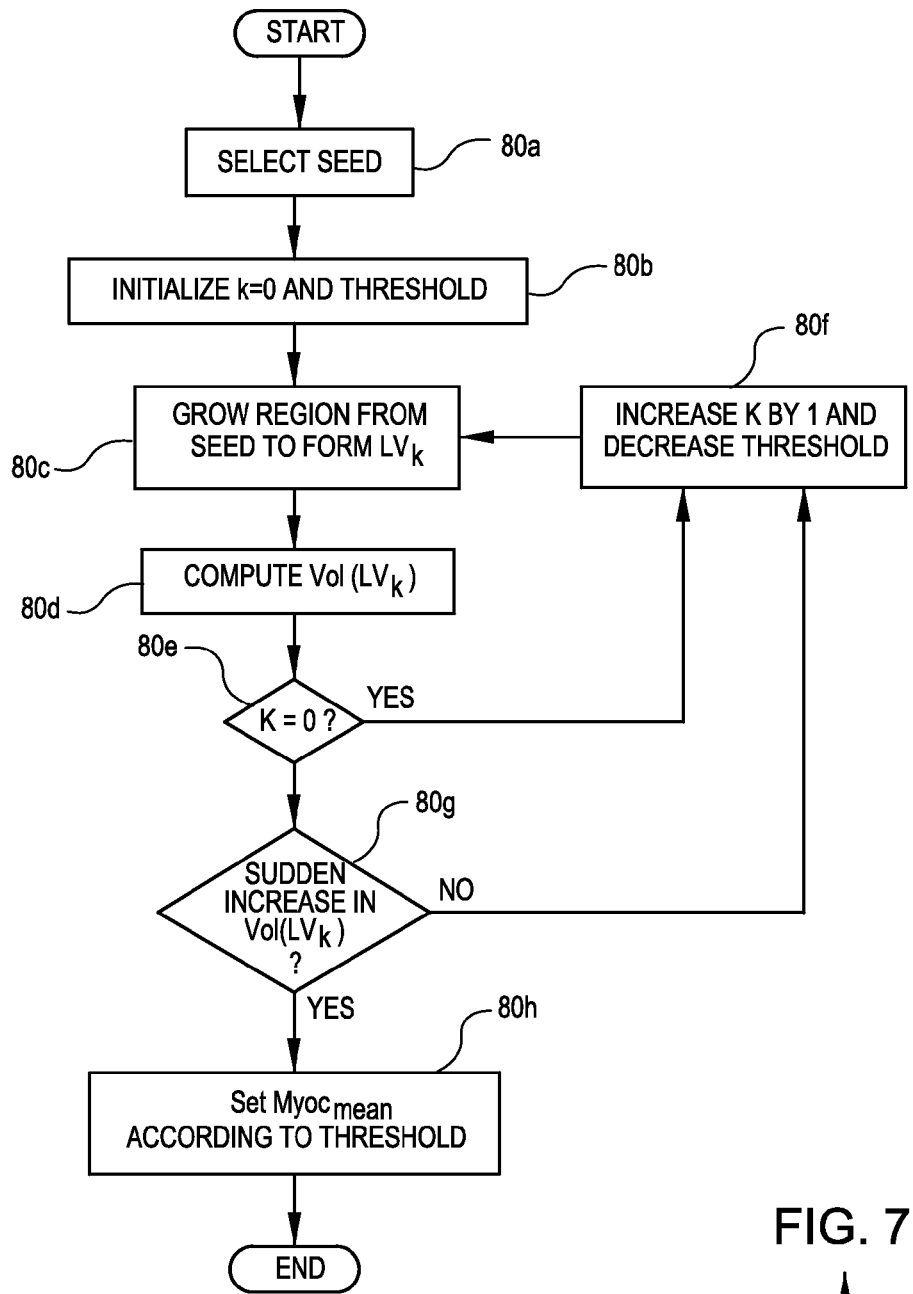

As noted above, images and metrics of the left ventricle and left ventricular function provide valuable information concerning cardiac health. However, existing methods for identifying and analyzing cardiac structures have difficulty accurately handling irregular structures such as the outer edge of the left ventricle at the basal or apical ends. Moreover, such methods often entail increased cost due to the requirement for extensive human intervention to achieve acceptable accuracy. Manual tracing has been considered the gold-standard for cardiac output quantification in clinical practice. However, manual tracing is labor-intensive and time consuming, and the results are subject to inter- and intra-observer variability. Additionally, complex cardiac structures such as papillary and trabecular muscles make it difficult to accurately trace the left ventricle margins in detail. Attempts to automate such processes have proven less than fully satisfactory.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Referring now to the drawings, in which like reference numerals represent like parts throughout the several views, FIG. 1 shows an imaging system 20 in accordance with an embodiment. The imaging system 20 includes a scanner 22 in communication with a control CPU 24 for controlling the scanner 22, an operator station 26 for allowing human control of the control CPU 24 and scanner 22, and an image processor 28 for analyzing images of subjects scanned by the scanner 22.

The scanner 22 can be any device capable of measuring data from an object, such as a person, for later processing into images. In an embodiment the scanner 22 is a Magnetic Resonance Imaging (MRI) scanner and includes a radio frequency (RF) coil 30, an x-gradient 32, a y-gradient 34, and a z-gradient 36, all controlled by the control CPU 24. The scanner 22 operates by creating a uniform magnetic field around an object to be scanned and emitting through the RF coil 30 radio waves into the subject. The x gradient 32, y gradient 34, and z gradient 36 are operated by the control CPU 24 so as to control the location in the subject being scanned.

Generally, scanners such as the scanner 22 include a chamber 38 from which a table 40 extends. Typically, a patient 42 or other subject lies on the table 40 which is mechanically operated so as to place the patient 42 into the chamber 38 for scanning. Looking to FIG. 2, when the patient 42 is being scanned by the scanner 22, the scanner 22 scans the patient 42 about a scanning plane 44 so as to collect data for an image of the patient 42 at an intersection of the scanning plane 44 and the patient 42. For example, as shown in FIG. 2 the plane 44 is normal to the patient's 42 length, intersecting the patient 42 through his or her chest in order to produce a picture of a cross section of the patient 42. Generally, the scanning plane 44 can intersect the patient 42 at any orientation, as determined by the x-gradient 32, y-gradient 34, and z-gradient 36. The resulting picture of the scanning shown in FIG. 2 is seen on a slice 46 which shows a left ventricle 48, myocardium 50, right ventricle 52, and other structures located in the patient 42. In an embodiment, the slice 46 is one of many pictures taken at the same location at different times. As noted above, such slices can be referred to as frames.

FIG. 3 shows a schematic representation of the imaging system 20, in accordance with an embodiment. The imaging system 20 includes imaging hardware 54, such as the scanner 22, control CPU 24, operating station 26, and image processor 28, described above in connection with FIG. 1. Located on the imaging hardware 54, such as on the operator station 26, is an operating system 56, such as a UNIX operating system. Installed in the operating system 56 is imaging and data gathering software 58 used to control the scanner 22 and convert measurements of the scanner 22 into image data. An example of image/data gathering software is the GE Advantage Workstation® available from General Electric. In addition to the data gathering software, additional add-on modules can also be included, such as a segmentation module 60, which, in an embodiment, is a computer program or other mechanism for analyzing image data.

It will be appreciated that each program, module, and functional computational unit described herein, and each step executed by the automatic system, is implemented in an embodiment by a computer or computing device (generically "computer") reading computer-executable instructions from a computer-readable medium and executing said instructions or causing them to be executed. The computer-readable medium is a physical fixed medium such as a magnetic or optically readable (and potentially writable) disc, circuit, array, or other physically tangible element. In an alternative embodiment, "transient computer-readable media" may be used additionally or alternatively. Such media include radio and optical transmissions (generically "electromagnetic transmissions"), audio transmissions, whether human-perceivable or not, and so on. It will be appreciated that "computer-readable media" are distinct from "transient computer-readable media."

FIG. 4 shows an image 62, in accordance with an embodiment. As shown in the drawing, the image 62 is a series of slices 64 which are parallel two-dimensional pictures of a scanned object taken a short distance, such as one millimeter apart, from one another. In the image 62 shown in FIG. 4, the slices 64 begin at an initial mid-ventricular slice 66 and end at an apical slice 68.

FIG. 5 shows the image 62 and a voxel 70 of the image 62. As shown in the drawing, the voxel 70 represents a rectangular-prism shaped location of the left ventricle 48 corresponding to a mid-ventricular slice 71. In an embodiment, the voxel 70 includes information about the intensity of the corresponding location of the left ventricle 48, as measured by the scanner 22. The image 62 comprises a collection of similarly shaped voxels, each voxel carrying information about the intensity of its corresponding location. The voxels of the image 62 can also include information additional or alternative to intensity, and the information carried by each voxel can depend on the type of device used to obtain the image 62.

As noted above, left ventricular stroke volume and ejection fraction are important clinical indicators for diagnosing cardiovascular disease and for monitoring the effects of cardiotoxic drug therapies. Accurate LV segmentation is vital for proper quantification; the inclusion or exclusion of papillary and trabecular structures in the blood volume affects ejection fraction by clinically significant amounts.

In an embodiment of the invention, a novel technique for soft-segmentation is introduced. The blood volume of the left ventricle, accounting for papillary, trabecular, and partial voxels, is measured automatically for all phases and a user-selected range of slices. No prior shape information is assumed, except that the blood pool is enclosed by myocardium. Full-blood and full-myocardium signal statistics are estimated, and the blood content of the left ventricle is then quantified on a voxel-by-voxel basis. All slices, including basal and apical, are segmented; however, additional minimal user interaction may be necessary at basal slices.

Cardiac cine SSFP scans were performed on numerous patients with a GE Signa 1.5T scanner, with imaging parameters TR 3.4-4.5 ms, TE 1.1-1.9 ms, flip angle 55-60, matrix size 192×192-256×256, image dimensions 256×256, receiver bandwidth 125 kHz, FOV 320×288-360×360, slice thickness 6-8 mm, and slice gap 2-4 mm. The left ventricle in each patient was imaged in 6-10 slices, 20-28 cardiac phases.

In this embodiment of the invention, as represented in FIG. 6, segmentation is performed in 6 steps as follows: 1) (seeding step 74) estimate LV center point at a user-selected mid-ventricular slice via the Hough transform, 2) (initial volume location step 76) measure $\mu_b$ and $\sigma_b$ through edge-detection region-growth, 3) (sensitivity correction step 78) least-square fit a planar surface to the full-blood voxels to compensate for coil sensitivity variations, 4) (iterative thresholding step 80) estimate $\mu_m$, 5) (volume growth step 82 and partial volume calculation step 84) interpolate blood content of the voxels composing the LV cavity, and 6) (seed propagation step 86) propagate the segmentation seed point to an appropriate position in the next slice/phase. Steps 2-6 are repeated upon propagation, until all phases and all slices, the range of which is selected by the user, have been completed. In alternate embodiments, the above steps can be ordered differently and, in general, one step need follow another only when necessary.

At the seeding step 74, the Hough transform is performed on an initial mid-ventricular slice, selected by the user, to identify a point specifying a full-blood voxel within the left ventricular cavity. One or more voxels for a seed can alternatively be chosen manually, or through other methods capable of locating voxels in the left ventricle or other object intended to be seeded. For remaining slices and phases, a seed propagation technique is used after segmentation (seed propagation step 86).

Figure 7:
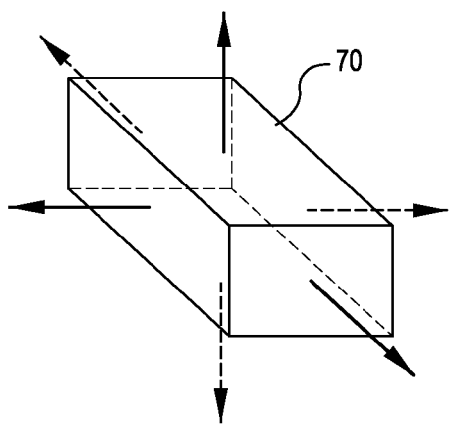
FIG. 7 is a side perspective view of the voxel of FIG. 5, with arrows demonstrating directions of growth in accordance with the method of FIG. 6.
Figure 8:
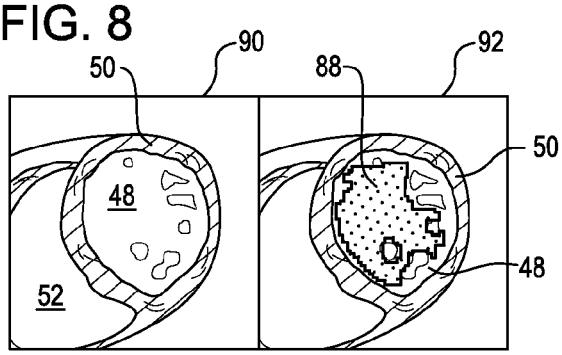
FIG. 8 is a representation of two identical slices shaded to demonstrate identification of a full blood region in accordance with the method of FIG. 6.

At the initial volume location step 76, edge-based region-growth (8-connected 2D, 10-connected 3D) is performed from the given seed point to discover voxels that are approximately full-blood. Region growth from the voxel 70 is demonstrated in FIG. 7, where the arrows normal to faces of the voxel 70 show the directions in which growth occurs. In addition to the directions shown in the drawing, region growth can proceed diagonally, in a plane and/or to other slices. The identified full-blood region 88 can be seen in FIG. 8, which shows an original image slide 90 adjacent to a partially segmented slide 92 showing the full-blood region 88. As shown in the drawing, the full-blood region does not occupy the entire left ventricle 48 as voxels at an outer edge of the left ventricle 48 have been identified as not containing full blood and therefore have not been included in the full-blood region 88. The mean and standard deviation ($\mu_b$ and $\sigma_b$) of this sample area is calculated, and the volume contribution from these voxels in all subsequent calculations is considered as full-blood.

At the coil sensitivity correction step 78, a least-squares planar surface is fit to the intensities of the voxels sampled by the second step in order to approximate and compensate for coil sensitivity variations across the area of the left ventricle. The plane is restricted by an upper and lower bound, according to maximum and minimum intensities observed over the sampled full-blood voxels. In general, any corrective technique can be employed according to the particular device used to obtain the image 62 and correction can be omitted when appropriate, such as when the device is of a type not requiring correction.

In order to estimate the myocardium mean signal intensity, at the iterative thresholding step 80, successive threshold based region-growth processes are run for an iteratively decreasing threshold, using the same seed as the second step. Eventually, region-growth leaks through the myocardium, "spilling" into surrounding structures (e.g., fatty tissue, right-ventricle, muscle, etc.) causing a discontinuity in the second-derivative of volume growth. This discontinuity can be used to detect at what threshold (an effusion threshold) region-growth has broken the bound of the myocardium.

An embodiment for a process for the iterative thresholding step 80 can be seen in more detail in FIG. 6a. In an embodiment the seed from the seed selection step 74 is identified at a seed selection step 80a. An index and a threshold value, each is updated each iteration, are initialized at an initialization step 80b. At a region growth step 80c, a region is grown from the seed identified in the seed selection step 80a. The volume of the grown region is calculated at volume calculation step 80d by summing the individual volumes of the voxels identified as part of the region. In order to ensure that at least two volumes are calculated, an index checking step 80e looks at the value of the index and proceeds to an update step 80f, in which the index and threshold are updated for the next iteration.

If it is determined at the index checking step 80e that the index is large enough, the rate of the volume growth between consecutive iterations is calculated at a volume rate step 80g. If there is has not been a sudden increase in the volume of the region grown, the update step 80f is performed again. If there has been a sudden increase in the volume of the region grown, at a myocardium mean step 80h, the myocardial mean value is calculated according to the threshold at which the sudden volume growth occurred.

Figure 9:
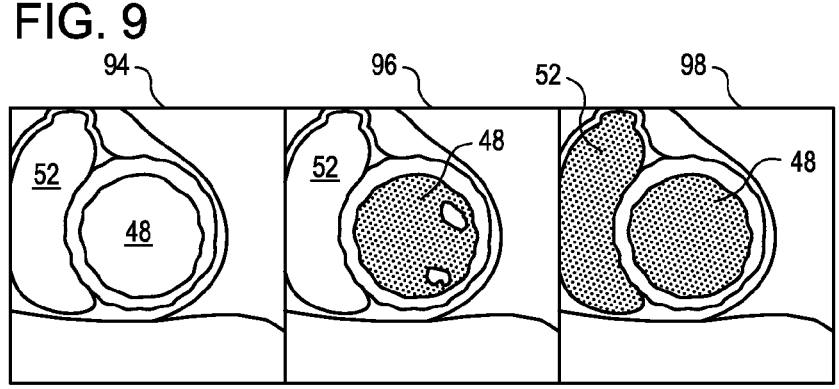
FIGS. 9 and 9(a) are representations of three identical slices shown at different iterations of the method of FIG. 6.

The results of the iterative thresholding step 80 can be seen in FIG. 9, which shows a left image 94 of an original image on the left, a middle slice 96 of the original image where region growth has occurred below the effusion threshold, and a right slice 98 where region growth has occurred at the effusion threshold. In the middle slice 96, the region growth has only detected parts of the left ventricle 48, as indicated by the shaded left ventricle 48. At the effusion threshold, the region growth has captured part of the right ventricle 52, causing the volume of the region to suddenly increase at a high rate.

Figure 9A:
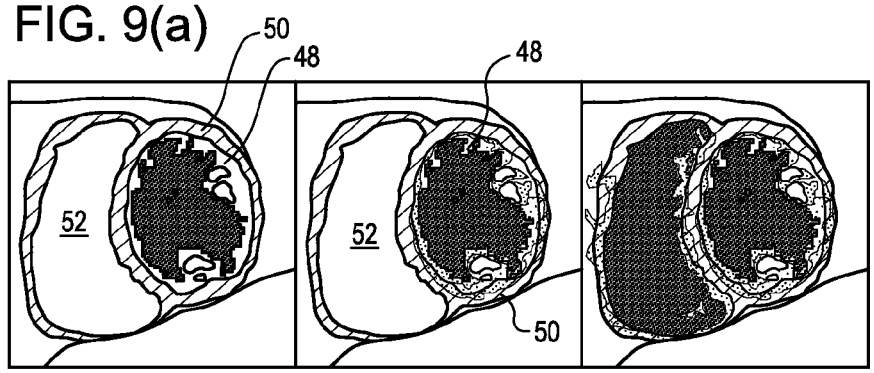

FIG. 9(a) shows the transition across the effusion threshold in more detail. The left image shows the region grown in the left ventricle several iterations before the effusion threshold is reached. As the effusion threshold is approached, more of the left region becomes part of the left ventricle, including voxels around the edge of the region shown in the left image, which are shown with a lighter dotted pattern. Once the effusion threshold is reached, the right ventricle 52 is captured.

Figure 10:
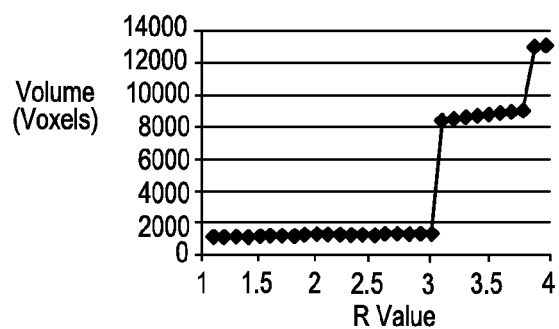
FIG. 10 is a graph demonstrating the behavior of the volume of the region grown in accordance with the method of FIG. 6.

The sudden increase in volume can be seen in FIG. 10, showing a plot of the volume of the region growth as the threshold is decreased, as indicated as an increasing R-value on the horizontal axis. Notably, the volume of the region (in terms of the number of voxels contained in the region) increases slightly but remains between 0 and 2000 voxels until the threshold is decreased enough that the volume of the region jumps to just over 8000 voxels. Also notable is that, as the threshold is decreased even more, the volume slightly increases again until making another sudden jump to approximately 13000 voxels, when the region leaks into even more structures in the image 62, such as fat, muscle, liver, and other parts surrounding the heart. Therefore, iterative thresholding is an effective method for iteratively identifying any number of objects in an image having some characteristic or attribute that varies among the objects.

Figure 11:
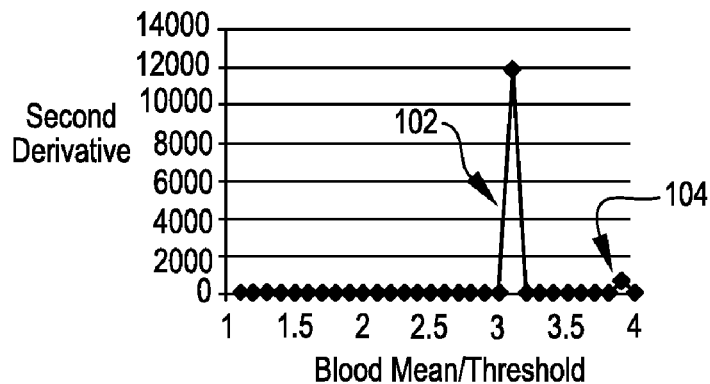
FIG. 11 is a graph of the second derivative of the volume of FIG. 10.

FIG. 11 shows the effect of iterative thresholding in terms of the second derivative of the volume, which is actually a discrete analogue of a second derivative as the region growth is a discrete process. Looking at the graph, whose horizontal axis increases as the threshold decreases, the point at which the volume suddenly increases is shown by a large hill 102 in the figure, which is caused by the sudden acceleration of the volume at the effusion threshold. Likewise, a smaller hill 104 to the right of the steep hill 102 corresponds to the second sudden jump in volume.

Figure 12:
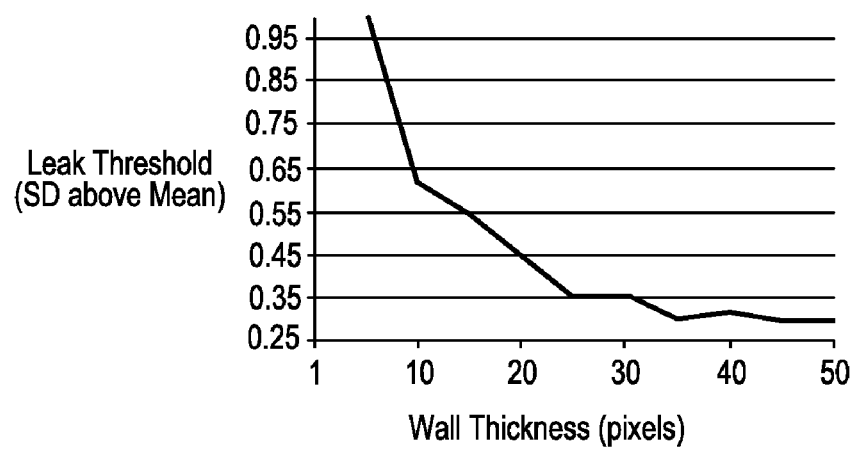
FIG. 12 is a graph of a leak threshold with respect to wall thickness in accordance with a simulation performed in accordance with the method of FIG. 6.
Figure 12A:
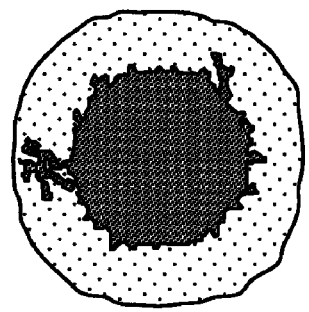
FIG. 12(a) is a view of an image of a simulation of the method of FIG. 6.

The threshold at which region-growth spills into surrounding structures is strongly correlated with the mean, standard deviation, and thickness of the myocardium, as seen in simulations such as that shown in FIGS. 12 and 12(a), which shows a simulation of threshold-based region growth seeded at the center of a ring of normally distributed intensities. Wall thickness is represented along the horizontal axis and the vertical axis represents the threshold (effusion threshold or leak threshold) at which region growth breaks the bounds of the ring, in terms of standard deviations above the mean.

Figures 13, 14:
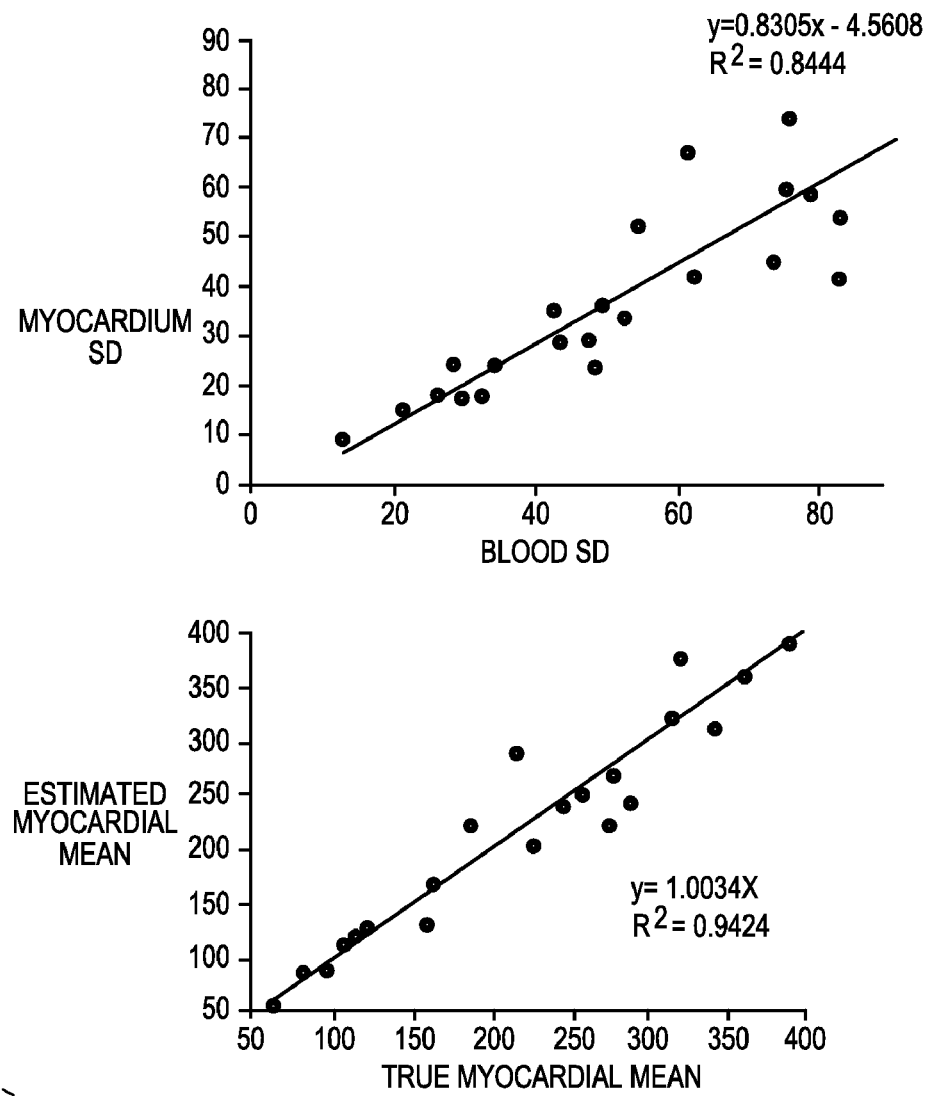
FIG. 13 illustrates graphs demonstrating a correlations between blood and myocardium statistics.
FIG. 14 is a table demonstrating results of various segmentation methods.

As the values on the horizontal axis approach infinity, the effusion threshold converges to 0.2 in the simulation. A fixed constant can be used to predict the distance, in terms of standard deviations, of the mean from the leak threshold, over a range of expected myocardium thicknesses, with little influence in aggregate volume estimation from estimate error (see Appendix). For this example, a fixed distance of 0.9 standard deviations was chosen, with $\sigma_b$ being used as an estimate of $\sigma_m$. In a sample of 23 slices from patient cases, the two were found to be well correlated, as shown in FIG. 13, a graph showing a correlation between $\sigma_b$ and $\sigma_m$ across 23 sample images from a database of 40 patients in which full-blood and full-myocardium voxels were manually traced and care was taken to exclude partial voxels (voxels corresponding to a region that is not completely or not nearly fully filled with blood) from the measurement.

The total blood volume of the left ventricle is determined by the summation:

$$V = \sum_x h(x)w(x), \quad [\text{Eq. 1}]$$

where V is volume, h(x) is the histogram of the left ventricle, and w(x) is the weight (voxel percent blood content) associated with voxels of intensity x. Assuming a noiseless system and a good point spread function, $$w(x) = \frac{x-M}{B-M}, \quad [\text{Eq. 2}]$$

where B and M are the signal intensities associated with full-blood and full-myocardium, respectively.

Accounting for Gaussian noise, B and M are assigned $(\mu_b - n\sigma_b)$ and $(\mu_m + n\sigma_b)$ respectively, where n=2. The assignments ensure at least 99.4% of full-blood and full-myocardium voxels will be weighted correctly, while maintaining the proportionality of partial voxel interpolation.

Region-growth is then performed again for the last time, using a threshold of $(\mu_m + n_o)$. Except for voxels visited during the second step, which are always counted as full-blood, the blood content of each voxel visited is interpolated using Eq. 2.

The seed point for the next slice or phase is determined by examining an 11×11 window in the next image centered about the previous slice segmentation's center-of-mass. An energy function based on distance from the center of the window and the intensity difference from the previous slice's blood mean is applied to each pixel in the window:

$$E(p)^{\varpi} = \sqrt{\left(\frac{2\sigma_{prev}}{w-1}|p_{COM}^{\varpi} - p^{\varpi}|\right)^2 + (I_{new}(p) - \mu_{prev})^2} \quad [\text{Eq. 3}]$$

where p is the evaluated pixel position, Inew(p) is the intensity of the evaluated pixel, pCOM is the center-of-mass of the previous segmentation, w=11 is the window width, and $\sigma/\mu_{prev}$ is $\sigma/\mu_b$ of the previous segmentation. The pixel with the lowest energy is chosen as the next seed point. Steps 2-6 are then repeated on the new image using the selected seed point.

In this embodiment of the invention, while the shape of the endocardium as a contour cannot be perfectly reconstructed due to blurring of complicated structures, the blood content (volume) of the left ventricle can be closely reconstructed with linear or other combination of signals and a good point-spread function. This system has demonstrated a robust ability to quantify volume with good accuracy in substantially less time than manual segmentation, and is able to capture structural complexities of the left ventricle in vivo not attainable by human contour tracers in a practical amount of time.

While some user interaction was necessary at the basal slices to close the myocardium, these slices can be skipped until automated segmentation has completed all other phases and slices. End-diastole and end-systole can then be correctly identified, and the remaining basal slices segmented with minimal user assistance. Such a process would limit the number of slices requiring manual input to 2 or less per case (corresponding to each end phase).

Volume error resulting from incorrectly estimating the myocardial signal mean is roughly equal to the signal estimation error, the difference between the two means, and the proportion of partial voxels. Assuming the partial volume histogram is relatively constant:

$$Err \approx \frac{E(\mu_m) - \mu_m}{\mu_b - \mu_m} \cdot PVP$$

where Err is the relative error, $E(\mu_m)$ is the estimated $\mu_m$ and PVP is the proportion of the total volume contributed by partial voxels. Significant errors in $E(\mu_m)$ lead to insignificant errors in total volume, since the scale factor $(\mu_b - \mu_m)$ is on average 2.5 times larger than $\mu_m$ alone (evaluated from a sample 23 slices of group A). As an example, a 50% error of myocardium mean estimation with 25% total volume contributed by partial voxels would roughly translate to a 5% error in the total volume.

Table 1 shown in FIG. 14 shows average segmentation results. Manual volume measurements were significantly larger than their PVS counterparts. Percent volume contribution from partial voxels is as reported by the PVS algorithm. Relative difference is the subtraction of PVS from manual, scaled by manual; positive values imply manual value was greater than PVS.

Table 2 shown in FIG. 15 shows average segmentation results from a different experimental group. Manual method 1 includes papillary/trabeculae in the blood volume. Method 2 excludes. Percent volume contribution from partial voxels is as reported by the PVS algorithm. Relative difference is the subtraction of PVS from manual, scaled by manual; positive values imply manual value was greater than PVS.

Figure 15A:
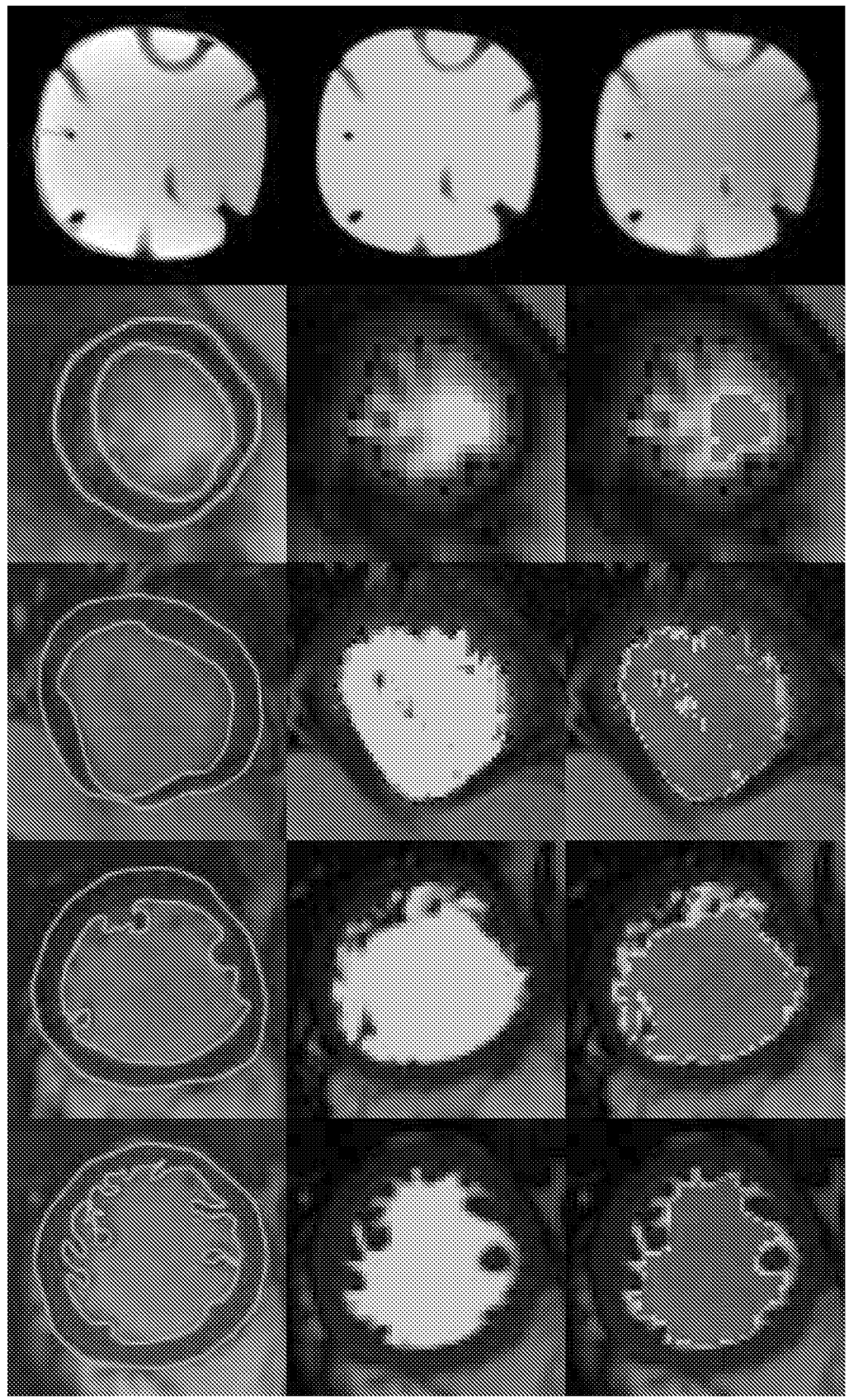
FIG. 15(a) is a series of slices demonstrating results of partial voxel segmentation, in accordance with an embodiment.

The results of PVS can be seen in FIG. 15(a). The top row, excluding the last column, shows the results of manual segmentation, in which a thin contour extends around the left ventricle. The second row, excluding the last column, shows a determination of the left ventricle through PVS. The middle of each image is uniform in intensity, corresponding to full-blood voxels of the left ventricle. At the edge of each uniform region, the voxels vary in intensity according to the amount of blood in each voxel. This effect is seen in greater detail in the third row, excluding the last column, where the full-blood voxels are darkened in order to highlight the partial voxels surrounding the left ventricle.

In an embodiment of the invention, left ventricle segmentation employs an automated left ventricle segmentation algorithm using graph searching based on intensity and gradient information and a priori knowledge for short axis cardiac MRI. This technique is referred to herein by the shorthand moniker "lvGIGA." The lvGIGA technique as described herein was implemented with coil sensitivity non-uniformity correction and polar coordinate transformation. Graph searching and expansion were applied for extracting myocardial endocardial and epicardial borders. Left ventricle blood and myocardium intensities were estimated for accurate partial volume calculation of blood volume and myocardial mass.

For the base data, cardiac cine SSFP images were acquired from numerous patients. The lvGIGA algorithm was used to measure blood volume, myocardial mass and ejection fraction, and compared with clinical manual tracing and commercially available MASS software. It was found that the success rate for segmenting both endocardial and epicardial borders was 95.6% for lvGIGA and 37.8% for MASS (excluding basal slices that required manual enclosure of ventricle blood). The lvGIGA segmentation result agreed well with manual tracing (full volume calculation) with an accuracy of −2.9±4.4 mL, 2.1±2.2%, and −9.6±13.0 g for blood volume, ejection fraction, and myocardial mass, respectively. As such, it is apparent that the lvGIGA algorithm substantially improves the robustness of LV segmentation automation over the commercial MASS software.

Figure 16:
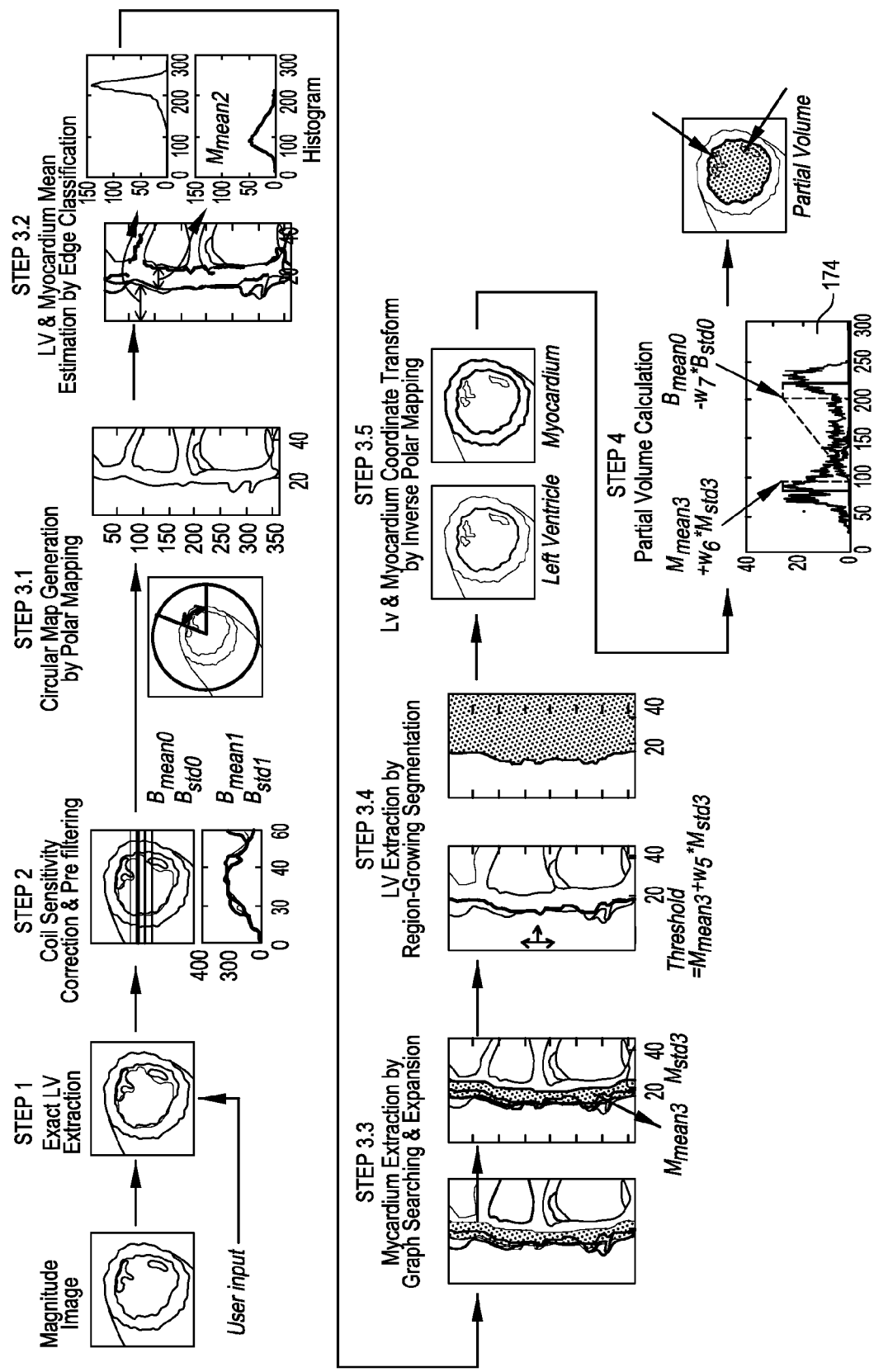
FIG. 16 is a visual schematic flowchart demonstrating a method for segmenting an object in an image, in accordance with an embodiment.
Figure 17:
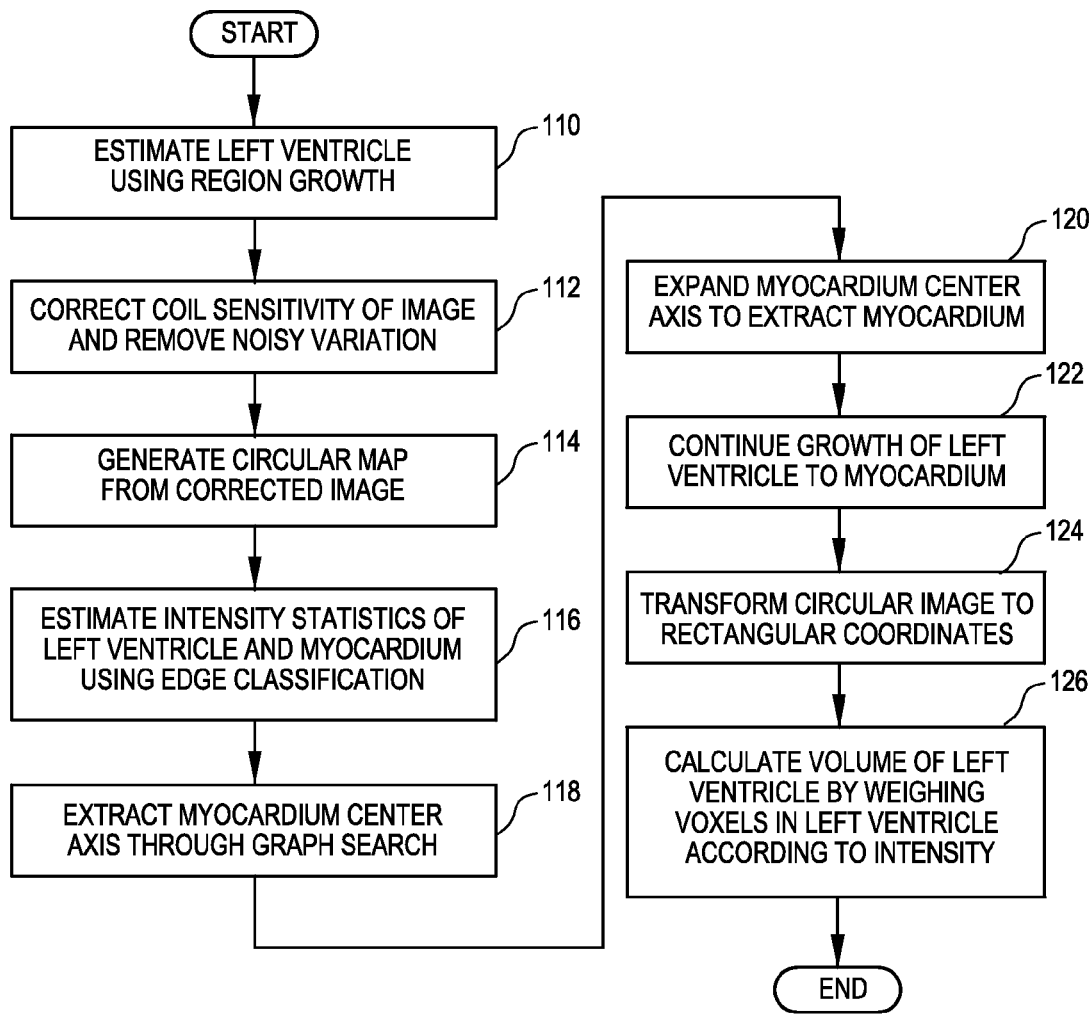
FIG. 17 is a flowchart demonstrating the method of FIG. 16, in accordance with an embodiment.

The following common information from short-axis cardiac MRI is used in lvGIGA: LV blood is surrounded by myocardium, LV is circular, blood has similar signal intensity, myocardium has similar signal intensity, and blood signal intensity is sharply different from myocardium. Using this base knowledge, the lvGIGA method calculates the partial volume of LV as shown in FIGS. 16 and 17. In overview, the method entails executing the following steps:

(1) Extracting initial LV using region growth (LV estimation step 110);
(2) Correcting coil sensitivity of image and remove noisy variation (sensitivity correction step 112);
(3) Segmenting LV and myocardium;
   (3.1) Generating circular map from corrected image (circular mapping step 114);
   (3.2) Estimating intensity statistics of LV and myocardium using edge classification (edge detection step 116);
   (3.3) Extracting myocardium by graph searching and expansion (center axis extraction step 118 and axis expansion step 120);
   (3.4) Detecting LV by region-growing segmentation (continued growth step 122);
   (3.5) Transforming coordinate from circular map to image (remapping step 124); and
(4) Calculating partial volume of LV (partial volume calculation step 126).

These steps will be discussed in greater detail below.

Extracting Initial LV

On short axis cine MRI magnitude images, one can extract an initial LV by region-growing from a user-selected point with a tight constraint of less than 5% intensity difference among neighboring points. Extraction in such a manner is advantageous as it is a computationally simple mechanism for obtaining basis statistics about the LV region, such as the mean intensity. However, other mechanisms for selecting the initial LV region can be used, such as manually selecting the LV region.

Coil Sensitivity Correction and De-Noising Pre-Filtering

In an embodiment of the invention, image intensity variation due to non-uniform surface coil array sensitivity is corrected by first fitting a plane equation F(X,Y) by a least-square solution using pixels in the initial LV, and then dividing the image intensity by a factor $$F(X,Y)/F(Cx,Cy),$$

where i and j are [1, M] and [1, N], and M and N represent the width and height of images, and Cx and Cy represent the X and Y coordinate of center-of-gravity in the initial LV.

Figure 18:
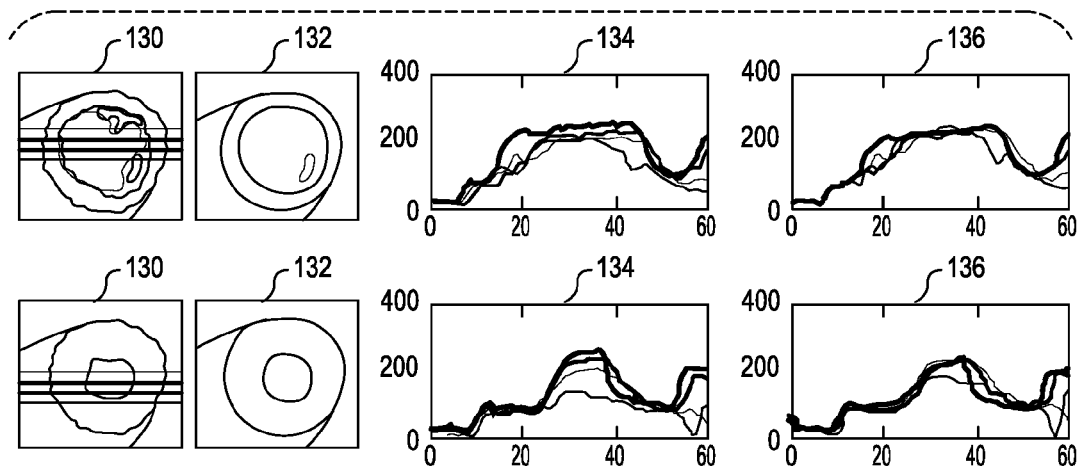
FIG. 18 is a series of images demonstrating coil sensitivity results, in accordance with the method of FIG. 16.

FIG. 18 shows coil sensitivity correction results, which include magnitude images 130, residual images 132, pre-correction intensity profiles 134, and post-correction intensity profiles 136. Residual images represent the intensity difference between before and after coil sensitivity correction, a necessary step for automated segmentation. For increasing the robustness in edge detections of later steps, denoising pre-filtering is applied to obtain a pre-filtered and corrected image. The method then calculates blood intensity mean and standard deviation, $B_{mean0}$ and $B_{std0}$, of the initial LV from the coil sensitivity corrected image and blood intensity mean and standard deviation, $B_{mean1}$ and $B_{std1}$, from the pre-filtered and coil corrected image.

Left Ventricle and Myocardium Segmentation; Circular Map Generation

Since the LV has a generally circular shape, the method can generate a circular map by polar mapping, where the center of polar-mapping is the center-of-gravity (such as a center of intensity or center of other characteristic or attribute) from the initial LV, by converting Cartesian coordinate (x, y) to polar coordinate (radius r, radian θ). In an embodiment of the invention, the radius of the circular region is roughly selected to cover the cardiac area. Other coordinate systems can also be used. For example, the method can leave the image in rectangular coordinates or it can map to any other convenient coordinate system.

Rough Statistical Estimation of LV Blood and Myocardium Using Edge Classification In an embodiment of the invention, as shown in FIG. 19, the method extracts edge information by the Canny detector from the circular map of the denoised coil-corrected image, and classifies two edges in the following manner. Points for the 1st edge are identified by searching in the radius r direction from the LV gravity center using the constraint that intensity at the left of the edge is larger than intensity at the right of the edge by $B_{std1}$ or more. Points for the 2nd edge are identified by searching further in the radius r direction from the 1st edge using the constraint that intensity at the left of the edge is less than $B_{mean1} - B_{std1}$. FIG. 19(a) shows the Canny edge detection and FIG. 19(b) shows the 1st edge 142 and 2nd edge 144 classification. Intensity differences are shown in FIG. 19(c). Next, as shown in FIG. 19(i), in radius direction, the system calculates an intensity histogram between the LV center and points identified on the 1st edge as the histogram of LV blood. Similarly, it calculates in the radius direction a histogram between the 1st edge and 2nd edge as the histogram of myocardium. Finally, as seen by the shaded areas in FIG. 19(i), the method estimates the mean of LV blood intensity, $B_{mean2}$, and the mean of myocardium intensity, $M_{mean2}$, from the maximum frequent location in the smoothed blood and myocardium histogram.

Myocardium Extraction by Graph Searching and Expansion

In an embodiment of the invention, the method detects the center axis of the myocardium by a graph searching technique and extracts the myocardium by expanding the myocardium center axis using its intensity statistics. A graph is constructed assuming that each pixel is connected with its neighboring pixels in the radian θ direction on the circular map. A cost in each node of the graph is computed by combining the normalized intensity difference and gradient, shown in FIG. 19(d), as follows:

$$\text{Cost} = w_1 \cdot \frac{|I(i, j) - M_{mean2}|}{|\text{Max}(I(i, j))|} + w_2 \cdot \left(\frac{G(i, j)}{\text{Max}(G(i, j))}\right)$$

where I is the image output from Step 2, G is its corresponding gradient f, and $M_{mean2}$ is as derived above. Cost is low when intensity is similar to $M_{mean2}$ and gradient is small (e.g., for locations far from edges). The values $w_1$ and $w_2$ are weighting constants to control dependency and both can be set to 1.0 or any other value as necessary. This procedure is illustrated in FIGS. 19(c)-(e). FIG. 19(e) shows the cost function in each pixel of the graph with brightness representing cost and FIG. 19(f) shows the accumulated cost.

The graph searching technique is applied to find the minimal cost path in the radian θ direction. In particular the method calculates accumulated cost in each pixel by adding the minimum cost in previous pixels, θ-1, and a weighted distance to its own cost as follows:

$$AccCost=Cost(i,j)+\min\{Cost(i+k,j-1)\}+w_3 \times dist(k)$$

where k is a searching range of previous pixels, $w_3$ is a weighting constant and we set as 0.01 and dist(k) represents a distance from the previous minimum cost pixel. After calculating the accumulated cost from the beginning (j=1) to the end (j=N), the system reversely traverses pixels with minimum accumulated cost in searching range k. During traversing, edge information is used to avoid searching beyond the edge. The retrieved minimum cost path is defined as the myocardium center axis.

The process then calculates the mean and standard deviation, $M_{mean3}$ and $M_{std3}$, of the myocardium center axis and expands that center axis to detect the myocardium. This expansion is performed in radius r and radian θ direction by comparing intensity. While $I(i,j)-I(a_x,a_y) < w_4 \times MC_{Std3}$ is satisfied, the process continues the expansion. Otherwise, the method ceases expansion in that direction. The parameters $a_x$ and $a_y$ represent the pixel in the myocardium center axis. The value $w_4$ is a weighting constant. In an embodiment of the invention, $w_4$ is set to 1.2 and 2.0 for endocardial and epicardial contour detection, respectively. FIGS. 19(g)-(h) show the myocardium center axis 158 and myocardium 50 by graph searching and expansion.

Figure 20:
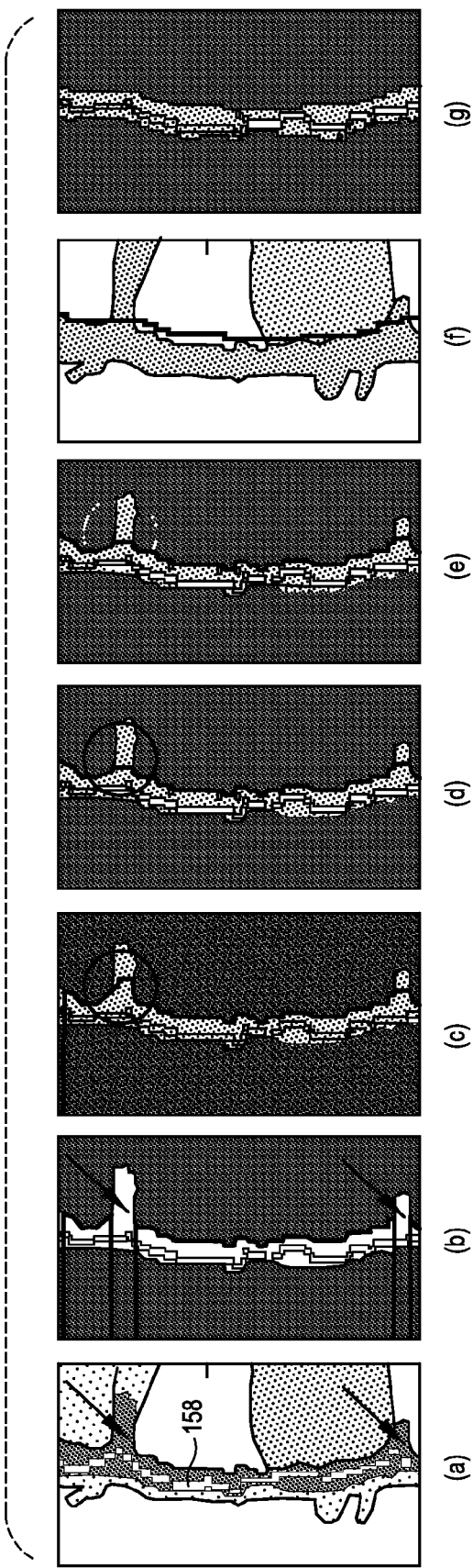
FIGS. 20(a) through 20(g) are a series of images showing remediation of leakage problems in accordance with the method of FIG. 16.

As shown in FIG. 20, the epicardial contour in an MRI may not be well defined when the intensity differences between myocardium and other tissues are small. FIG. 20(a) illustrates a case where arrows point to locations with problematic epicardial contour definition in a circular map. As a result, myocardium region expansion in the radius direction (searching for epicardial contour) has a leakage problem as shown in FIGS. 20(b)-(c), in particular, as shown by the arrows in the FIG. 20(b). In an embodiment of the invention, this leakage may be apodized in the following manner. First, the method calculates the average distance between the endocardial contour and myocardium center axis 158 (half thickness, th), and the average distance between the endocardial contour and epicardial contour (full thickness, tf).

As shown in FIG. 20(b), precise epicardial contour points are retrieved by searching points with myocardial thickness in the range (tf−th, tf+th). Then, the algorithm traces the epicardial contour along the θ-direction forward and backward, where if a consecutive change in myocardial thickness is larger than th, the epicardial radial location at that point is set to the radial location of its preceding contour point (see FIGS. 20(c)-(d) which show forward contour tracing and backward contour tracing, respectively). Finally, the epicardial contour's radial position is updated with the minimum among the forward and backward contour tracings (see FIG. 20(e)). To remove small variations or "noise," the method applies low-pass filtering to the epicardial contour (see FIG. 20(f)-(g)).

LV Detection By Region-Growing Segmentation

Next the LV is segmented by a region-growing method. On the circular map, region-growing starts from the initial L. The region grows if the signal intensity of each pixel is larger than region-growing threshold $M_{mean3}+w_5 \times M_{std3}$ with $w_5=1.2$. The region-growing stops if it meets the myocardium extracted above. In other words, the myocardium is a constraint to block region-growing in the radial direction.

Coordinate Transform of LV and Myocardium

The segmented LV blood and myocardium is converted from polar coordinates to Cartesian coordinate, using inverse calculation of the polar mapping.

Partial Volume Calculation

Recall that the system has segmented LV and calculated intensity statistics of the LV and myocardium: $B_{mean0}$, $B_{std0}$, $M_{mean3}$, and $M_{std3}$. In order to design an intensity weighting function for calculating partial volume of LV, two constants, $M_{right}$ and $B_{left}$, are defined as follows:

$$M_{right}=M_{mean3}+w_6 \times M_{std3}$$

$$B_{left}=B_{mean0}-w_7 \times B_{std0}$$

where $w_6$ and $w_7$ are constants to control volume calculation and are set to 1.2 and 1.2, respectively. Using these values, the intensity weight function is designed as follows:

$$PV = 1 \quad \text{if} \quad I_c(i,j) \geq B_{left}$$

$$PV = 0 \quad \text{if} \quad I_c(i,j) \leq M_{right}$$

$$PV = \frac{I_c(i,j) - M_{right}}{B_{left} - M_{right}} \quad \text{if} \quad M_{right} < I_c(i,j) < B_{left}$$

Here $I_c$ only contains the coil sensitivity correction, avoiding denoising pre-filtering that may obscure the fine details of papillary and trabeculae muscles (PTM). The designed intensity weighting function for partial volume calculation is shown in the slide 174 of FIG. 16, where the histogram of LV blood is represented by the right-most histogram, the histogram of myocardium is in on the left, and the PTMs are indicated by arrows.

To evaluate the described system, cardiac cine SSFP were acquired from a number of patients using a GE Signa 1.5T scanner. The imaging parameters were TR 3.3-4.5 ms, TE 1.1-2.0 ms, flip angle 55-60, matrix size 192×192-256×256, image dimensions 256×256, receiver bandwidth 125 kHz, FOV 290-400×240-360, slice thickness 6-8 mm, and slice gap 2-4 mm. The LV in each subject was imaged in 6-10 slices, 20-28 cardiac phases. A total of 635 images (two cardiac phases, systole and diastole, from all patients) were segmented by manual tracing, the described lvGIGA segmentation, and the MASS commercial software. Manual tracing was performed with papillary and trabeculae muscles excluded from the blood volume. Trabeculae were defined as myocardium protruding >1.5 mm from the circumferential contour of the LV cavity, with equivalent signal intensity to the adjacent LV wall. Basal image positions were defined by the most basal image encompassing at least 50% of circumferential myocardium, and did not vary in automated analyses. All tracings were performed blinded to other automated results.

Endocardial volume in diastolic and systolic phase, epicardial volume, and ejection fraction were measured using our lvGIGA segmentation and compared with manual tracing and the commercial MASS software (MASS Analysis, General Electric, Waukesha, Wis.). We calculated both full volume (FV, without partial volume consideration) and partial volume (PV) for LV endocardial volume at both diastole and systole. We measured the diastolic epicardial volume (including both LV blood and myocardium). Myocardium mass was derived from the epicardial volume and endocardial volume difference multiplied by the density of myocardium (1.05 g/mL). Linear regression and Bland-Altman analysis were performed to assess the correlation between manual tracing with the MASS software and our lvGIGA segmentation.

The performances of automated algorithms lvGIGA and MASS were evaluated in the following manner. When either of these two automated algorithms generated a contour that deviated from the LV border by more than 10% in area as visually estimated by the operator, the algorithm was judged to have failed and the contour mis-segmentation was then corrected by user intervention. The number of user interventions was recorded for each algorithm.

The endocardial blood volume in diastolic and systolic phase, the ejection fraction, the epicardial volume in diastole, and the myocardial mass were 144.5±50.0 mL, 60.5±44.7 mL, 61.5±14.3%, 266.5±91.5 mL, 128.1±50.9 g for measurement with manual tracing, 146.8±50.5 mL, 64.1±45.0 mL, 59.4±14.1%, 277.9±90.7 mL, 137.7±49.1 g for measurement with the lvGIGA algorithm, and 164.5±55.1 mL, 73.2±51.5 mL, 58.8±14.3%, 287.4±101.1 mL, 129.1±57.5 g for measurement with the MASS software.

Figure 22:
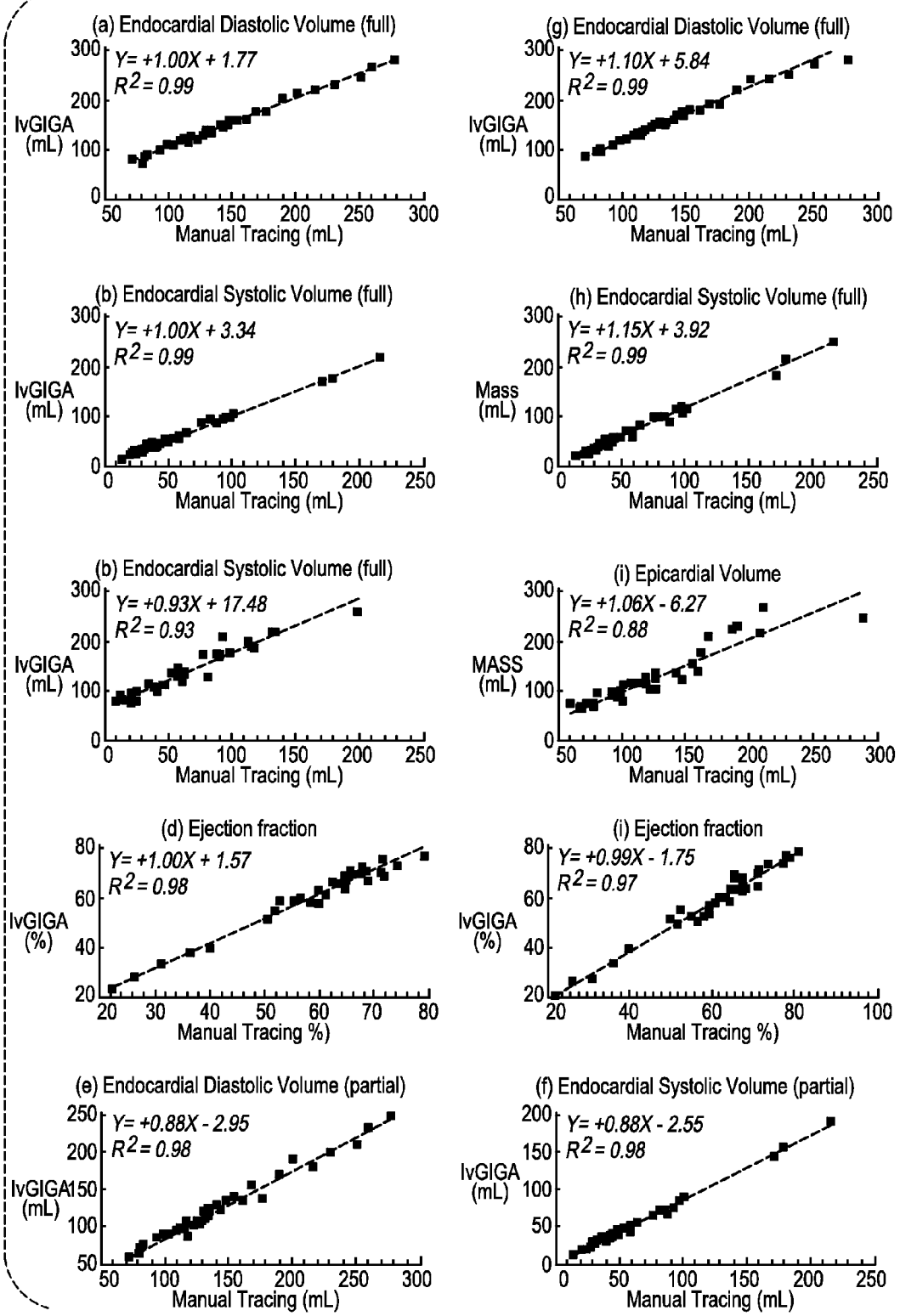
FIG. 22 is a series of graphs demonstrating results of various segmenting methods.
Figure 23:
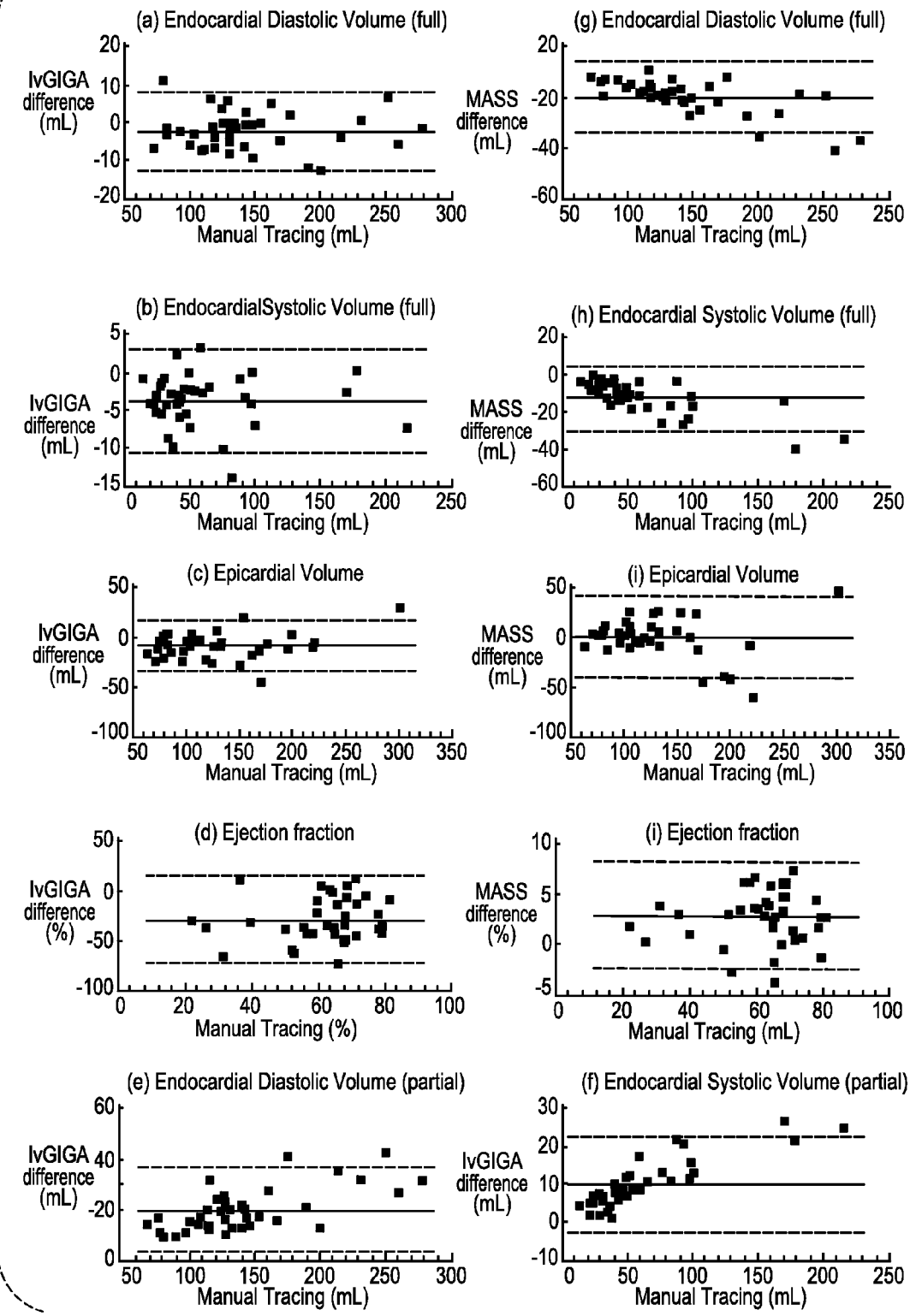
FIG. 23 is a series of graphs demonstrating results of various segmenting methods.

Comparisons of manual tracing with the lvGIGA segmentation and of manual tracing with the MASS software are summarized in Table 1 (FIG. 21) and FIG. 22. While blood volume measurements from the lvGIGA algorithm in full volume were similar to that of manual tracing, corresponding lvGIGA blood volume measurements in partial volume were smaller than manual tracing, and MASS blood volume measurements were larger than manual tracing because papillary and trabeculae muscles were not excluded. However, the ejection fraction measurements were similar for all three measurement methods, manual tracing, lvGIGA, and MASS. Both lvGIGA and MASS showed slightly poorer correlation with manual tracing for myocardial mass measurements than for blood volume measurements, possibly due to additional discordance in epicardial contour segmentation. These agreements and disagreements among manual tracing, lvGIGA, and MASS are illustrated in the Bland-Altman plots in FIG. 23.

Table 2 (FIG. 24) summarizes the number of user interventions to correct for mis-segmentations for both lvGIGA and MASS software. While basal slices are problematic for both lvGIGA and MASS because of the LV outflow tract disruption of the myocardial border, the lvGIGA drastically reduced the number of intervention needed by MASS for both endocardial (from 10.6% to 0.6% slices) and epicardial (from 51.6% to 3.8% slices) contour segmentation. Excluding the basal slices, lvGIGA has a success rate of 95.6% and MASS 37.8% for LV segmentation. FIG. 25 shows an example of LV segmentation using the three methods, illustrating the quality in defining endocardial 176 and epicardial 178 contours, and partial volume. The top row of pictures are original intensity images. The next three rows relate to the lvGIGA method, in particular, by row order, to segmenting left ventricles, myocardiums, and finding partial volumes, respectively. Moving further down the figure, the next row shows segmentation by manual tracing. The penultimate row shows MASS segmented left ventricles and myocardiums before manual intervention and the last row shows MASS segmented left ventricles and myocardiums after manual intervention.

The data demonstrate that the described left ventricle segmentation algorithm based on graph searching using both intensity and gradient information and simple a priori knowledge (lvGIGA) provides LV segmentation in good agreement with clinical manual tracing and improves substantially the robustness of accurate automation over commercial MASS software. Additionally, the lvGIGA algorithm is capable of separating blood and myocardium within the same voxel, potentiating accurate measurements of small structures and partial volumes.

The myocardial enclosure geometry allows identification of the inner endocardial border as the first significant gradient line and the outer epicardial border as the second significant gradient line in the polar coordinate. Blood and myocardial intensity statistics are iteratively estimated as endocardial and epicardial border definitions improve during the segmentation. Intensity and gradient information are combined to determine the cost function for graph searching and expansion, which is further constrained by smoothness of myocardial thickness. In this manner, the lvGIGA algorithm accurately identifies endocardial and epicardial borders and blood and myocardial signal statistics for blood volume and myocardial mass measurements.

When the myocardial contour is disrupted by the LV outflow tract in the basalmost slice, lvGIGA requires manual intervention though less frequently than the commercial MASS software. Otherwise, lvGIGA almost eliminates the need for manual intervention, while MASS software requires manual intervention in about half of the slices. With regard to automation robustness, lvGIGA offers a substantial improvement over MASS. In the 4 non-basal slices where lvGIGA failed to identify the endocardial border, two were apical slices where lvGIGA was unable to define the LV gravity center due to irregular blood and myocardium distribution, while the other two slices had very bright areas within the myocardium. In the cases lvGIGA failed to accurately identify the epicardial border, there was an insufficient difference in signal intensity between myocardium and adjacent organs such as the lungs, causing the segmented myocardium to include these tissues. Also, the smoothing during the epicardial contour detection process tends to ignore possible complex myocardial texture, resulting "under-segmentation." In comparison, the endocardial border has clear boundary between LV and myocardium and require no smoothing in detection. This may explain that the epicardial volume difference with manual tracing was found to be larger than endocardial volume difference. This under-segmentation problem may be addressed by integrating the lvGIGA output into active contour model or level-set methods.

The denoising pre-filtering is beneficial for reliable estimation of edges in lvGIGA algorithm, but it also smoothes out fine muscular structures, resulting in apparent "over-segmentation" for blood. The partial volume calculation of blood volume and myocardial volume compensate for this problem using pre-denoised images. Conceptually, the partial volume calculation is significant for the accurate volume determination from cine cardiac MR images, which are typically acquired using 10 mm thick slices (including gap) and consequently have substantial voxels that contain a mixture of blood and myocardium. To evaluate these partial volume effects, a true reference standard for blood volume and myocardial mass is beneficial.

In an alternative embodiment, after coil-sensitivity is compensated for, and the LV endocardium is segmented by a seeded region growing scheme whose threshold is iteratively determined by detecting the effusion into the surrounding myocardium and tissues. Then, to extract the epicardium, a circular map is generated, edge information of the LV is calculated, and the active contour model guided by the endocardial border and the myocardial signal information estimated by iterative thresholding is used to extract the epicardial contour. This iterative thresholding and active contour model with adaptation (ITHACA) algorithm was compared to manual tracing and the commercial MASS Analysis software (General Electric). The ITHACA algorithm was found to be a substantial improvement over the MASS software in defining myocardial borders and agreed well with manual tracing with a mean difference of blood volume and myocardial mass were 2.9±6.2 mL (mean±standard deviation) and −0.9±16.5 g, respectively. The difference was smaller than the difference between manual tracing and the MASS software (~−20.0±6.9 mL and −1.0±20.2 g, respectively).

In overview, in order to segment the endocardium, the coil-sensitivity of the magnitude image is corrected and a seed region-growing scheme is applied where the threshold is determined iteratively by detecting the effusion into surrounding structures. To detect the epicardial contour and segment the myocardium (Myoc), a circular map (Cmap) is generated by polar mapping, and edge information is extracted on the Cmap and filtered using the endocardial segmentation. After defining an external force and constraints with information obtained from endocardium segmentation, the active contour model is applied to find the epicardial contour.

In this embodiment of the invention, the automatic LV segmentation algorithm consists of a soft endocardial contour extraction by iterative thresholding, and an epicardial contour extraction by active contour modeling.

The soft endocardial contour segmentation algorithm entails the following 5 steps:
1. Estimate the initial seed point;
2. Measure the mean and standard deviation of blood signal;
3. Compensate for coil sensitivity;
4. Estimate the myocardial (Myoc) signal intensity; and
5. Segment the LV and measure the blood volume.

Each of These Steps will be Discussed in Greater Detail Below.

To identify a seed point within the LV cavity, a circular Hough transform is performed on the subtraction magnitude of images from phases 1 and 10 (roughly corresponding to diastole and systole, respectively) of an initial mid-ventricular slice, selected by the user. A seed propagation technique is applied for the remaining slices and phases, where the seed point for the current slice or phase image is determined by examining an 11×11 pixel window whose center is the center of gravity of the segmented LV region in the previous image. The energy of each pixel in the window is calculated based on the distance from the center of the window and the intensity difference from the mean of LV region in the previous image:

$$E(p) = \left( \sqrt{\left(\frac{2\sigma_{prev}}{w-1}|p_{CoG}-p|\right)^2 + \left(I_{new}(p) - \mu_{prev}\right)^2} \right)$$

where p is the evaluated pixel position, $I_{new}(p)$ is the intensity of the evaluated pixel, $p_{CoG}$ is the center-of-gravity of LV region in the previous image, w=11 is the window width in number of voxels, and $\sigma_{prev}$ and $\mu_{prev}$ is the mean and standard deviation of LV region in the previous image. The pixel with the lowest energy is chosen as the seed point.

An edge-based region-growing scheme is performed from the initial seed point to find an LV region that is nearly full-blood. The mean and standard deviation ($LV_{mean}$ and $LV_{std}$) of this LV region is calculated, and the voxels visited in this step are considered as full-blood in all subsequent calculations.

Images from the MR scanner can have distortions depending on coil location that can affect segmentation and partial volume calculations. To compensate coil sensitivity across the area of the LV, a planar surface is fit to the voxels visited using least-squares.

In order to estimate the mean signal intensity, $Myoc_{mean}$, of Myoc, successive lower-bound threshold based region-growing scheme are run for an iteratively decreasing threshold, using the same seed as above. Eventually, region growth breaks through the Myoc, "effusing" into bright surrounding structures (fat, right ventricle, or muscle), causing a sudden increase in the apparent segmented volume, which can be characterized by a discontinuity in a ratio of consecutive volume growth. The discontinuity of volume growth during decreasing region-growing threshold is used to measure the threshold at which region-growth has penetrated the Myoc. The threshold at which region-growth effuses into surrounding structures is considered as the mean signal intensity, $Myoc_{mean}$, of the Myoc.

To segment LV region, region growing is performed again for the last time within that slice or phase image using an absolute threshold of Myocmean+n×LVstd, where n=2. Accounting for Gaussian noise, the assignments ensure at least 99.4% of full-blood and full-myocardium voxels will be weighted correctly, while maintaining the proportionality of partial voxel interpolation. The total blood volume of the segmented LV is determined by the summation of pixels as follows:

$$V = \sum_x h(x) \cdot w(x)$$

where V is volume and h(x) is the histogram of the LV. w(x) is the weighting function associated with blood voxels of intensity x and defined as w(x)=(x−M)/(B−M), where B and M are the signal intensities associated with full-blood and full-myocardium voxels. Accounting for Gaussian noise, B and M are assigned ($LV_{mean}$−n×$LV_{std}$) and ($Myoc_{mean}$+n×$LV_{std}$) respectively, where n=2. The pixels of the LV region above in this embodiment of the invention are always counted as full-blood. When w(x)=1.0, the blood volume of the LV is calculated without partial voxel effects.

Figures 24, 26:
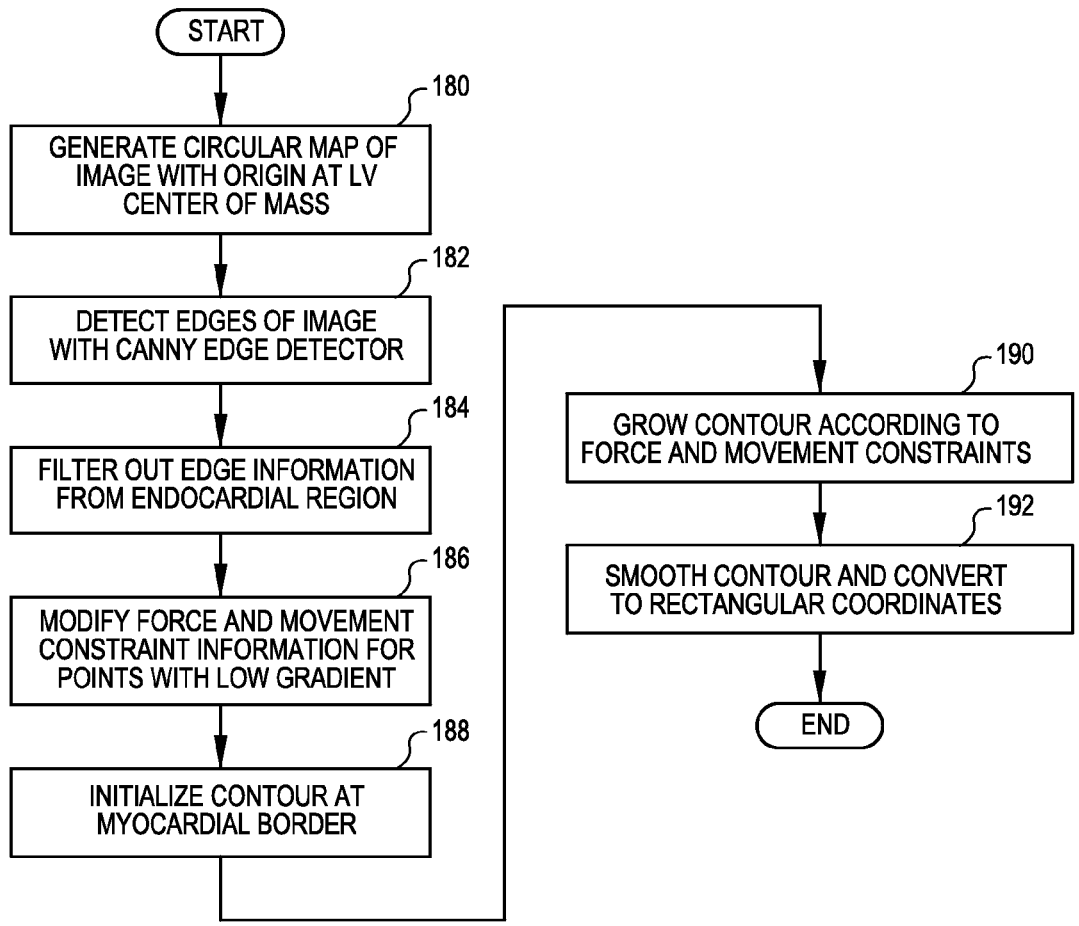
FIG. 24 is a table demonstrating results of various segmentation methods.
FIG. 26 is a flowchart demonstrating a method of segmenting an object in an image, in accordance with an embodiment.
Figure 25:
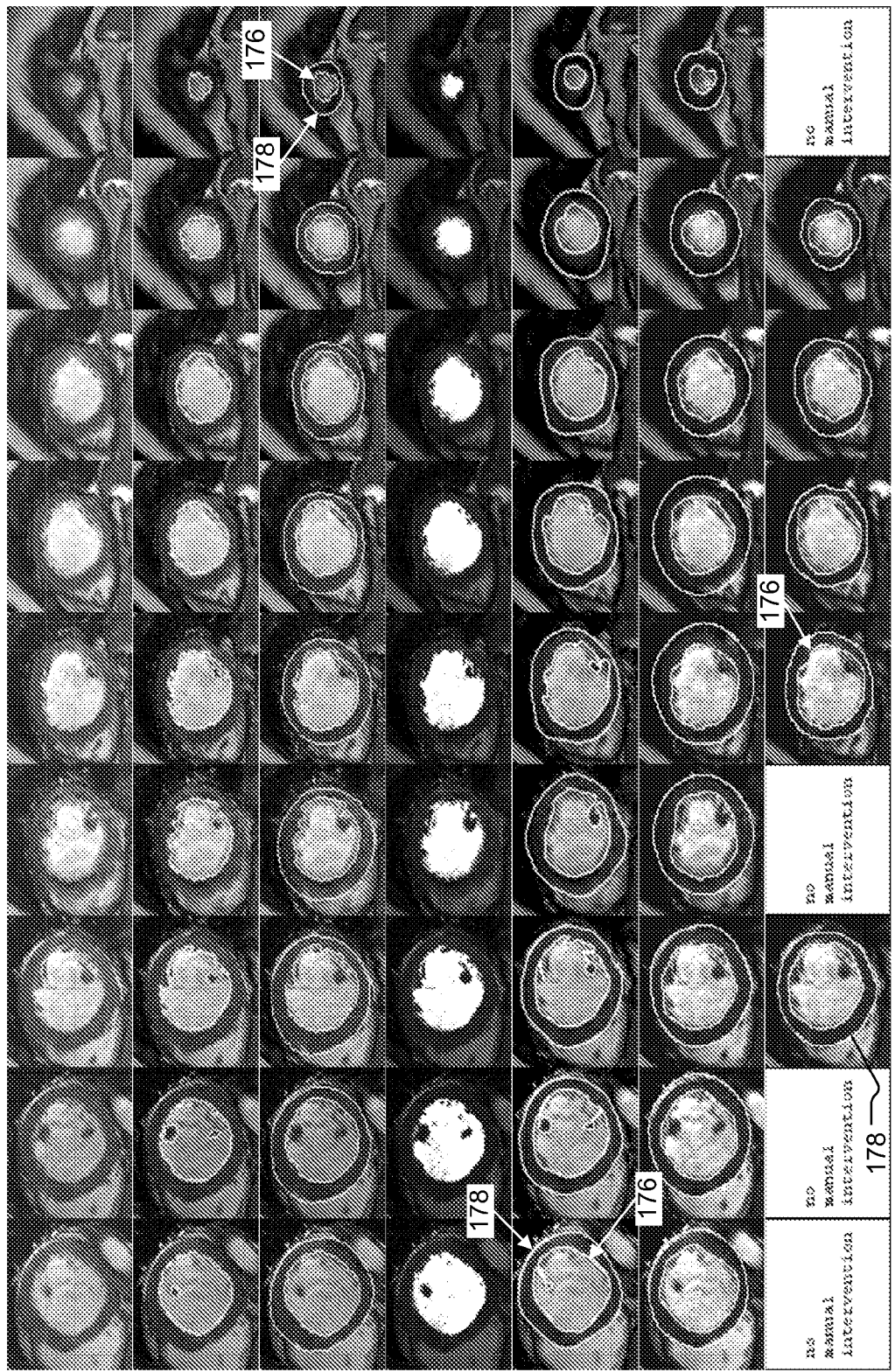
FIG. 25 is a series of graphs demonstrating results of various segmenting methods.

For epicardial contour extraction, a modified application specific active contour model algorithm (ACM) is developed, as shown in FIG. 26. Active contour models, also called Snakes, are can be formulated as, $$E_{snake} = \int_0^1 \{E_{internal}C(s) + E_{external}C(s)\} ds,$$

where C(s) is a list of contour points (x(s), y(s)), $E_{internal}$ is an internal energy caused by bending contours and $E_{external}$ is the attraction of image features such as edges. The points in the contour iteratively approach the boundary or edge of an object through the minimization of the Snake energy. The internal energy function is defined as, $$E_{internal} = \alpha(s)\left|\frac{dC}{ds}\right|^2 + \beta(s)\left|\frac{d^2C}{ds^2}\right|^2,$$

where α(s) is a measure of the elasticity of the ACM and β(s) is a measure of the stiffness of the ACM. The external energy function is defined by calculating the image (f(x,y)) gradients as, $$E_{external} = |\nabla f(x,y)|^2.$$

A critical weakness of general ACM is that it is susceptible to local minima; therefore, the initial contour should be defined near the searching objects. If the initial contour is located far from objects, it is difficult to define the external force and hence it does not converge to the desired segmentation. In this application, the problem is simplified, the intensity constraint is applied, and the external force is generated using prior knowledge even where it is not clear what the direction of the force should be.

These modifications for the epicardial contour extraction are expanded in the following 5 steps, shown in FIG. 26:

1. Generate a circular map through polar mapping about the endocardial center of mass (circular mapping step 180).
2. Extract edge information (edge extraction step 182), filter out the edge from the endocardium (edge filtering step 184).
3. Define the external force and constraint for the epicardial contour (constraint conditioning step 186).
4. Initialize contour at endocardial border (contour initialization step 188) and apply the epicardial active contour model initialized at the endocardial contour (contour growth and deformation step 190).
5. Update the epicardial contour (contour smoothing step 192) and transform the coordinates.

Step 1. Circular Map Generation

Since the LV has roughly a circular shape, we generate a circular map (Cmap) by polar mapping, where the center of the polar mapping is the center-of-mass, such as a center of intensity, from the endocardial region in Sec. 3.1 or other convenient point. Through this mapping, (x, y) Cartesian image coordinates are converted to (radius r, radian θ) polar coordinates. The maximum radius is selected to cover all potential cardiac short-axis surface areas (see, FIG. 27). The upper left picture 194 of FIG. 27(*a*) is a slice to be segmented. The conversion of the picture 194 to polar coordinates is shown in FIG. 27(*b*).

Step 2. Edge Information Extraction and Filtering

Figure 27:
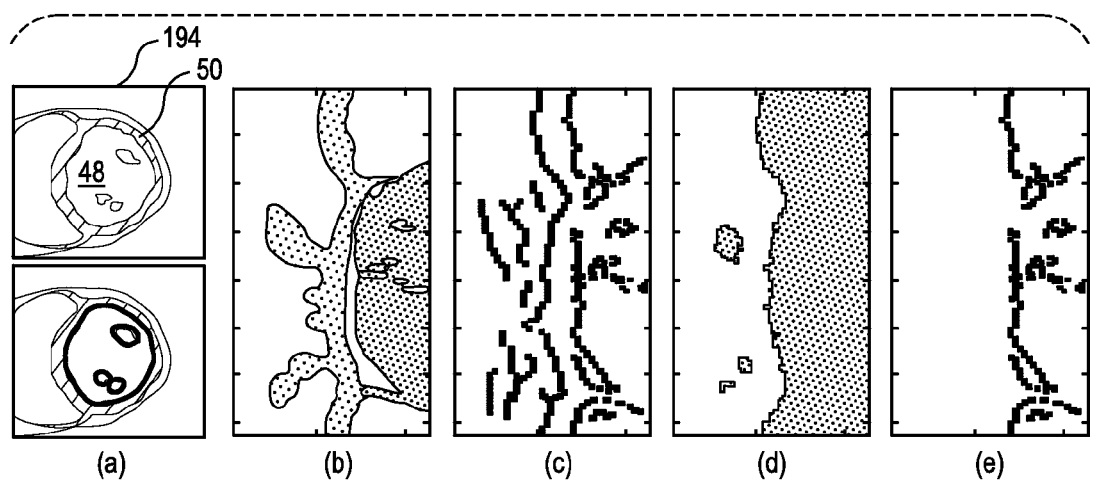
FIGS. 27(a) through 27(e) are a series of images demonstrating steps of the method of FIG. 26.

In the Cmap, edge information is extracted by applying the Canny edge extractor, the results of which are shown in FIG. 27(*c*). Since the endocardial region is segmented from iterative thresholding, edge information that comes from the endocardial region is filtered out.

Step 3. Modified External Force and Movement Constraint Definition

Figure 28:
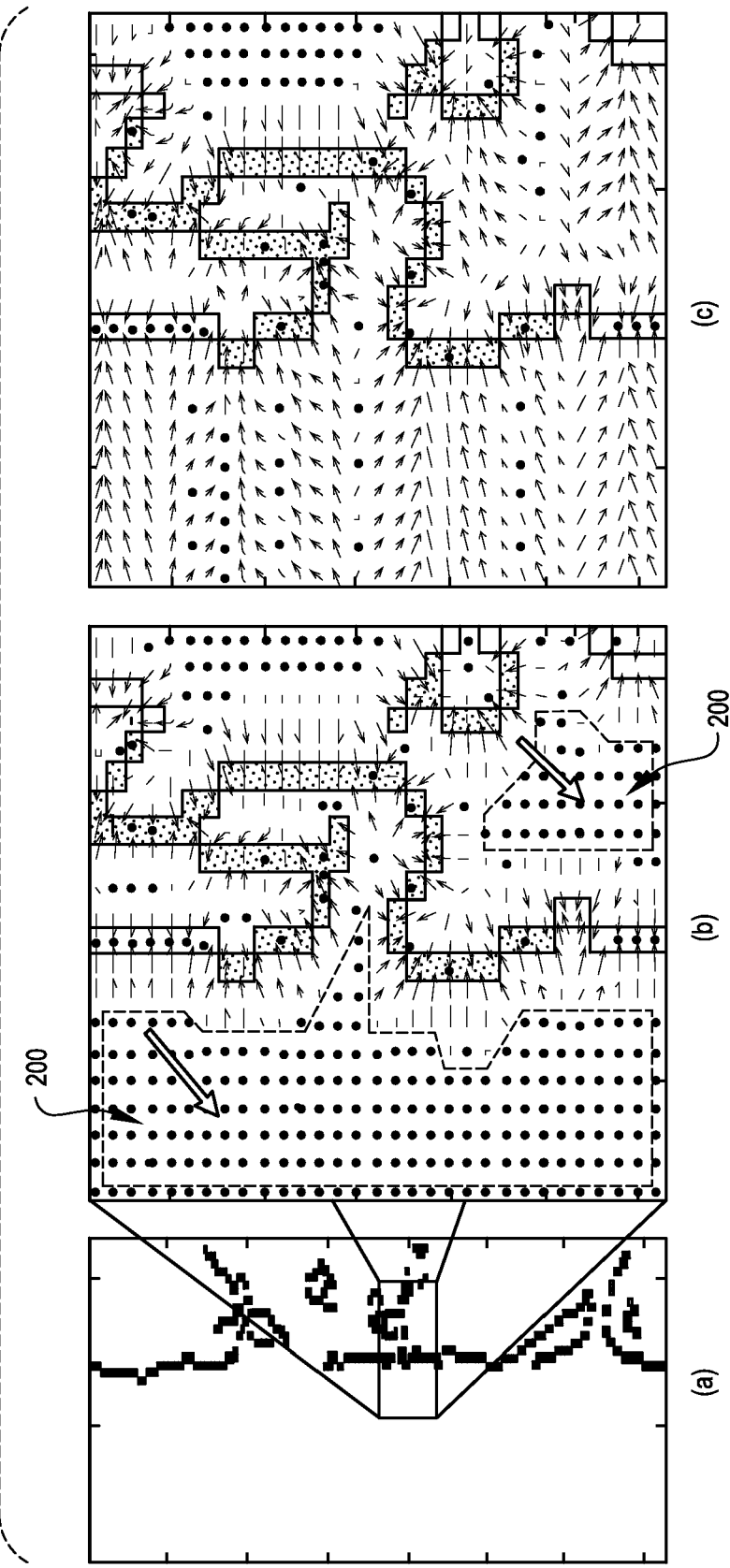
FIG. 28 shows a series of images demonstrating modification of a gradient field, in accordance with the method of FIG. 26.

In standard ACMs, the external force is only well defined near the targeted objects typically using the gradient vector force (GVF), and the external force far from the targeted objects are difficult to define. FIG. 28(*b*) shows the external force defined by gradients in an enlarged region of FIG. 28(*a*) where gradient values in the polygons 200 to which the arrows point are approximately zero. If a contour is seeded in those areas, there will be insufficient external force to move the contour. In our LV segmentation applications, the contour is initialized at the endocardial border of LV as determined above. For extracting the epicardial border, the initialized contour should move iteratively in the direction of increasing radius r. This prior knowledge can be used to condition the external force for effectively moving the contour in the following manner. After gradient calculation, gradients less than a pre-defined threshold are set to the right nearest gradients that are greater than the threshold. The result of setting gradients to the right can be seen in FIG. 28(*c*). The threshold used in this study was 0.03 (see FIG. 28(*c*)).

Figure 29:
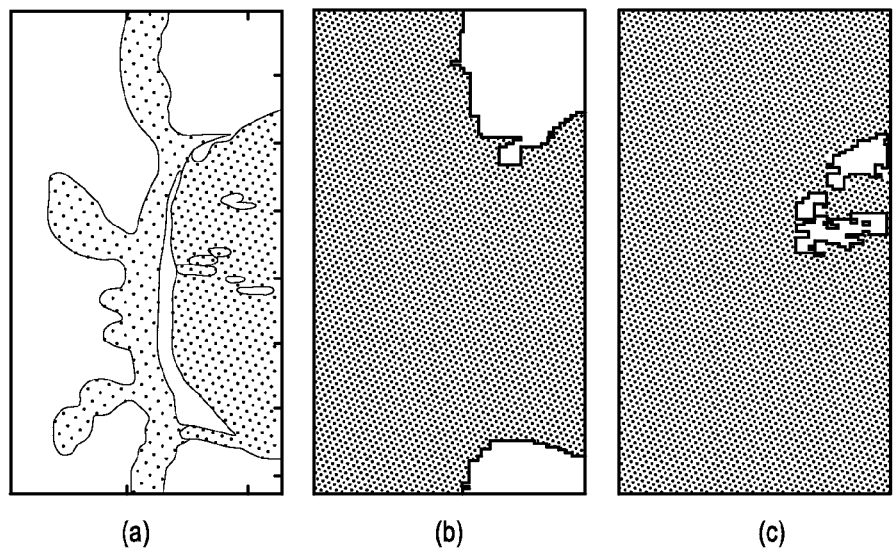
FIG. 29 is a series of images demonstrating modification of a gradient field, in accordance with the method of FIG. 26.

The information on myocardial intensity estimated from the iterative thresholding in Section 3.1 is used to further constrain the contour movement. Let $Myoc_{max} = Myoc_{mean} + 2.0 \times LV_{std}$ and $Myoc_{min} = Myoc_{mean} \times 0.4$. Regions where the intensity value is over $Myoc_{max}$ or below $Myoc_{min}$ (see FIGS. 29(*b*),(*c*), respectively) and where the surface area is larger than 240 pixels are used as a constraint to block the movement of the contour.

Step 4. Active Contour Model Segmentation

Figure 30:
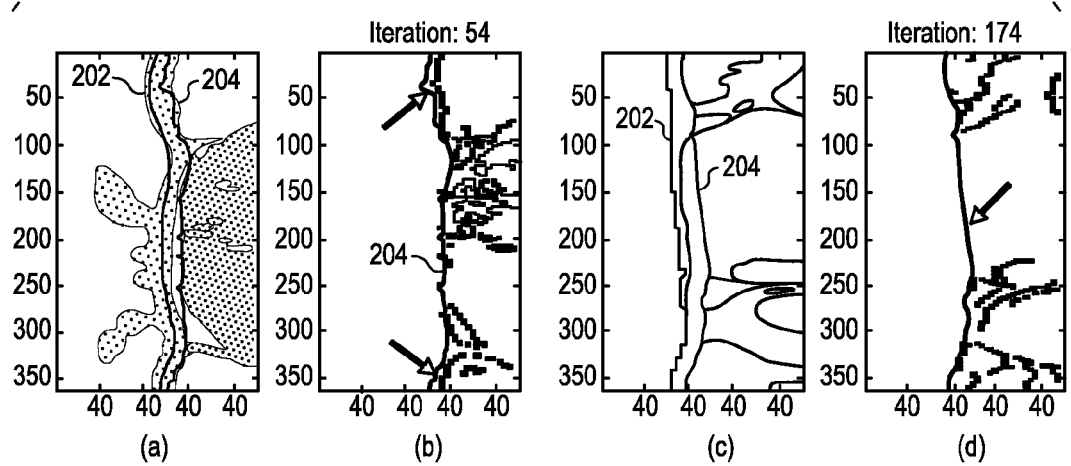
FIG. 30 is a series of images demonstrating modification of a gradient field, in accordance with the method of FIG. 26.

The active contour model guided the modified external force and the movement constraint in Step 3 is then applied for LV segmentation. The initial contour is set at the LV endocardial border determined from iterative thresholding in Section 3.1 or, in general, any method for obtaining the endocardial border. While iteratively minimizing the energy, the contour is limited to only move in the radial direction r, and stops if it meets the movement constraint. The average difference between contour points before and after each iteration is calculated and iteration is stopped if the average difference is below 0.01 pixels. FIG. 30 shows the results after ACM segmentation. The left contour line 202 represents the initial contour that is the endocardial border. The right contour line 204 represents the epicardial contour extracted by the ACM segmentation. The arrows in FIG. 30(*b*) locate the points that stop moving by the constraint. FIGS. 30(*a*) and 30(*b*) show how the ACM stops because of the myocardial intensity constraint (as indicated by the arrows). FIGS. 30(*c*) and 30(*d*) show how the ACM stops where the edges are not defined or extracted (as shown by the arrow).

Step 5. Epicardial Contour Updating and Coordinate Transform

Since the epicardial contour from ACM can have jagged patterns, a low-pass filter is applied to smooth the contour. Then, the epicardial contour is transformed in the image domain by a simple inverse calculation of polar mapping.

To evaluate the aforementioned method, data were acquired from cardiac MRI examinations previously performed on numerous patients (15 male, mean age 52.4 years±15.1 standard deviation). Cine SSFP scans were performed using a GE Signa 1.5T scanner, imaging parameters TR 3.3-4.5 ms, TE 1.1-2.0 ms, flip angle 55-60, matrix size 192×192-256×256, image dimensions 256×256, receiver bandwidth 125 kHz, FOV 290-400×240-360, slice thickness and slice gap 6-8 mm & 2-4 mm, respectively (total 10 mm). The LV in each patient was imaged in 6-10 slices, 20-28 cardiac phases.

A total of 339 images from 38 patients were segmented by the iterative thresholding and active contour model with adaptation (ITHACA) segmentation, with results compared to both manual tracing and to the commercial MASS software. Manual tracing was performed by an experienced physician with PTM's excluded from the blood volume. PTM were defined as myocardium protruding >1.5 mm from the circumferential contour of the LV cavity, with equivalent signal intensity to the adjacent LV wall.

Endocardial and myocardial volumes at diastole were measured using our ITHACA segmentation algorithm and the MASS software and compared with manual tracing. Calculated volumes are presented without partial volume interpolation. Although not utilized to gather the present data, recall that LV segmentation using iterative thresholding can calculate partial volume considering LV and Myoc intensity statistics. The difference between epicardial volume and endocardial volume is the myocardial volume which, multiplied by the known myocardial density of 1.05 g/ml, gives the myocardial mass. Linear regression and Bland-Altman analysis was performed to assess correlation between manual tracing, our ITHACA segmentation algorithm, and the MASS software.

Blood volume from manual tracing, our ITHACA segmentation, and the MASS software were 144.5 mL±50.0 (average±standard deviation), 141.6 mL±48.7, and 164.5 mL±55.1, respectively. Myocardial mass from manual tracing, ITHACA segmentation, and the MASS software were 128.1±50.9 g, 128.9±49.0 g, and 129.1±57.5 g, respectively.

Figures 32, 33:
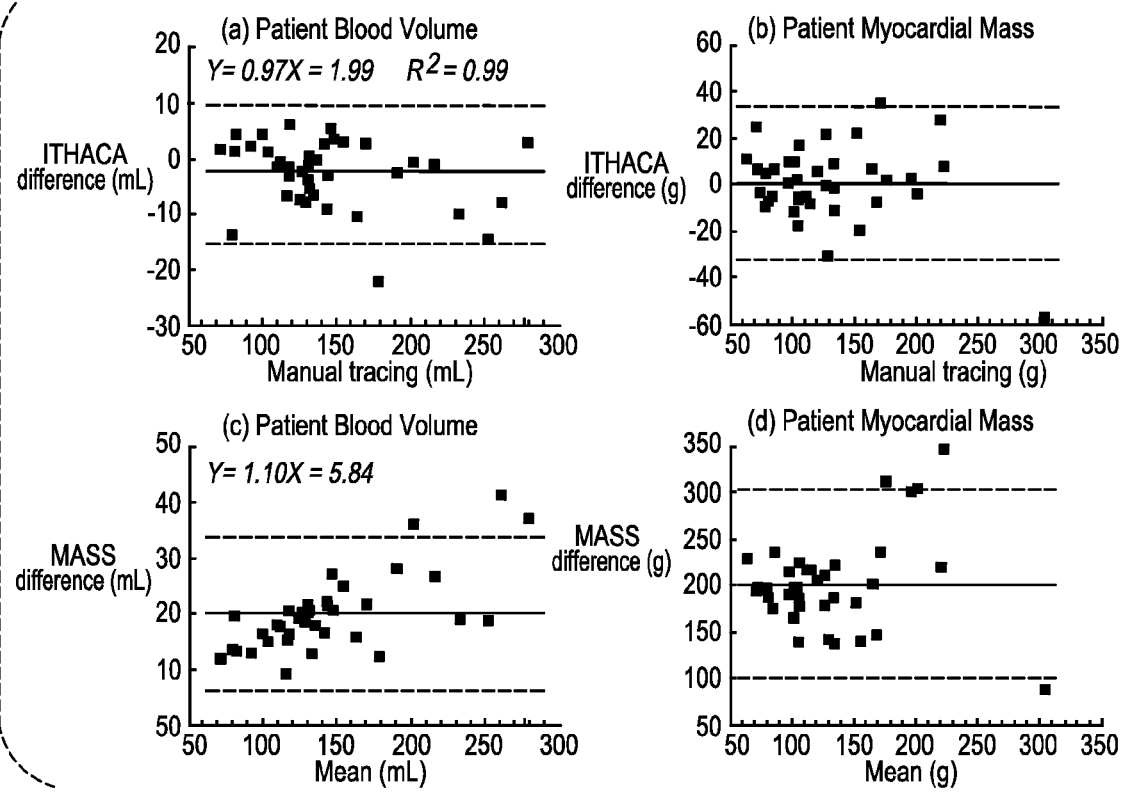
FIG. 32 is a table demonstrating results of various segmenting methods.
FIG. 33 is a series of graphs demonstrating results of various segmenting methods.
Figure 34:
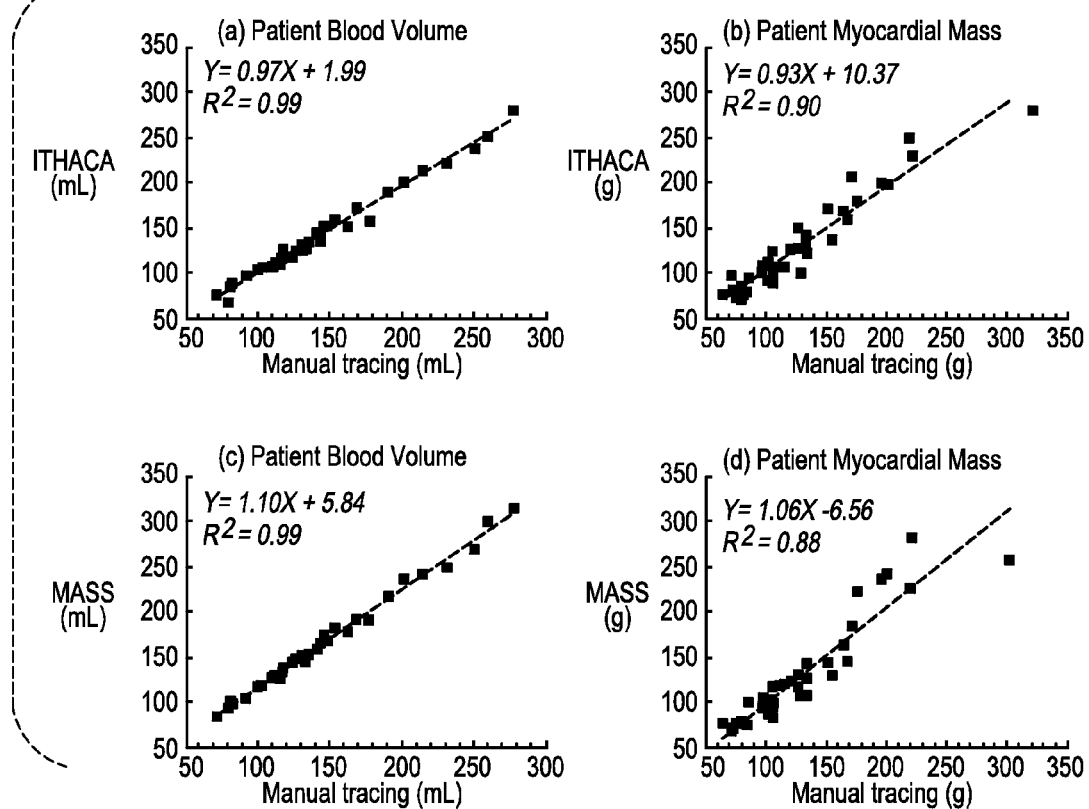
FIG. 34 is a series of graphs demonstrating results of various segmenting methods.

Comparisons on these measurements are summarized in Tables 1 and 2 (FIGS. 31 and 32, respectively) and FIGS. 33 and 34. Blood volumes measured from our ITHACA algorithm and the MASS software correlated highly with that from manual tracing (R2=0.99), and myocardial mass measurements were fairly correlative (R2=0.90 and 0.88 for ITHACA and MASS respectively). The Bland-Altman analysis (FIG. 34) indicated that the myocardial mass measurements agreed with each other very well, the blood volume measured from the ITHACA algorithm agreed well with that from manual tracing, but the blood volume measured from the MASS software was substantially higher than that from manual tracing due to the inclusion of PTM's in the LV blood by the MASS software.

Figure 35:
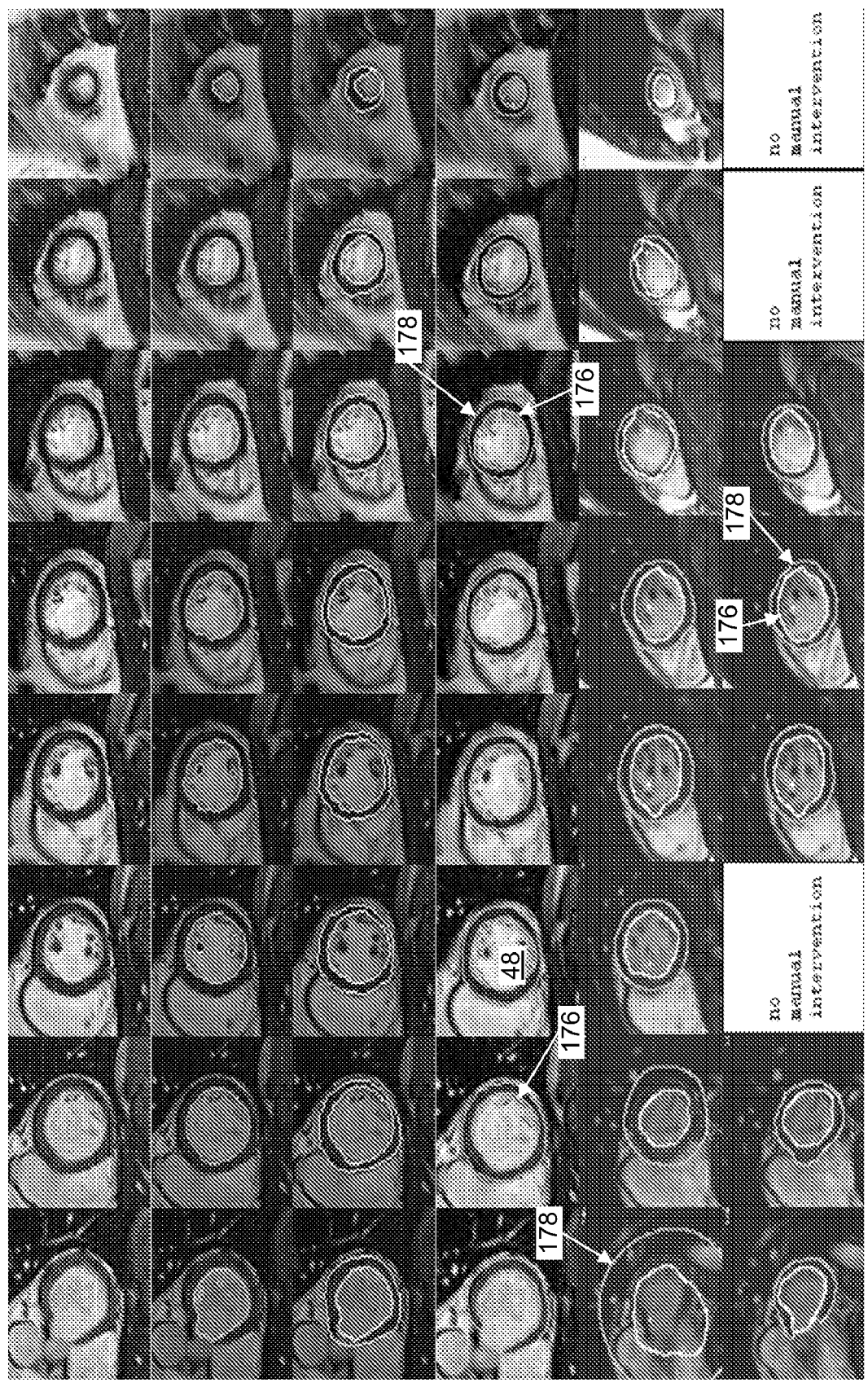
FIG. 35 is a series of images demonstrating results of various segmenting methods.

The performances of the ITHACA algorithm and the MASS software were summarized in Table 2 (FIG. 32). An example case of segmentation using all three methods is illustrated in FIG. 35. Counting from the top, the first row of pictures in FIG. 35 are of original images. The second and third rows show segmented LV regions and myocardiums, respectively, by the ITHACA method. The fourth and fifth rows show results for the MASS algorithm before manual intervention and after manual intervention, respectively. Either of these two automated software were judged to fail when it generated a contour that deviated from the ventricle border by more than 10% in area as visually estimated by the operator, as illustrated in FIG. 35. When this occurred, the operator performed manual correction on the contour.

Both ITHACA and MASS software required manual intervention at some basalmost slices (almost half of the patient cases), because of the lack of myocardial enclosure. For generating endocardial contour, the MASS software required manual intervention in most apical slices, and the ITHACA algorithm eliminated this problem. For generating epicardial contour, the MASS software required manual intervention for 51.6% slices, and the ITHACA algorithm reduced the need for manual intervention to 1.5% slices (near-complete automation).

The experimental data indicate that the ITHACA segmentation algorithm is highly accurate and robust in segmenting the LV mass and blood volume. This ITHACA algorithm provides a substantial improvement over the commercial MASS software that requires frequently manual intervention in almost every patient. While automated segmentation at the cardiac basal slice remains a concern, the ITHACA algorithm succeeds in eliminating the need for manual intervention at other slices (mostly apical slices) when segmenting the endocardial border and almost eliminates manual intervention when segmenting the epicardial border. Comparison with the clinical standard of manual tracing suggests that the ITHACA algorithm can be a valuable clinical tool for the rapid quantification of LV stroke volume, ejection fraction, and myocardial mass.

The ITHACA algorithm starts to extract the endocardial border using the geometric assumption that bright blood is surrounded by dimmer myocardium. This simple assumption does not require specific LV shape knowledge, and it is valid for all slices except for the basalmost slice where the LV outflow tract disrupts the closure of myocardium. By seeding at the LV blood, the blood and myocardium signal intensity profile can be estimated from region growth through iterative thresholding. The critical threshold is identified by the abrupt increase in region growth. This iterative thresholding approach in guiding region growth turns out to be very robust in automatically extracting LV blood.

The ITHACA algorithm extracts the outer epicardial border using the active contour model (ACM), which is adapted to or guided by the endocardial border and signal intensity profile already determined from the first part of iterative thresholding. The external force is conditioned to drive the contour from the endocardial border towards the epicardial border, and the search for epicardial border is further efficiently localized by blocking from areas with intensity above or below myocardial signal. This adaptation makes the ACM converge rapidly onto the epicardial border through a few iterations. Our experimental data indicate that this ACM with adaptation is quite robust in automatically extracting the epicardial border, enabling estimation of the LC myocardial mass.

The ITHACA algorithm did not eliminate the need for manual intervention when extracting the epicardial border in 1.5% of slices, where the signal intensity difference between myocardium and surrounding tissues (lung or liver) was almost zero. Experienced clinicians can draw a separation between myocardium and its surrounding based upon their training. This a priori knowledge of epicardial border shape may be incorporated in the conditioning of the ACM. Similarly, a priori knowledge of the outflow tract at the basalmost slice for the endocardial border may be incorporated to condition the region growth and completely eliminate manual intervention. On the other hand, the ITHACA algorithm may be more accurate at segmenting complex borders than manual tracing, causing a slight disagreement between manual tracing and our ITHACA algorithm. This kind of segmentation error was under 10% and was not corrected by user-intervention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A computer-implemented method for determining an attribute of a region of interest represented by a plurality of voxels, the method comprising:
    identifying a seed voxel that corresponds to a location completely within the region of interest;
    performing region-growth to identify a set of voxels, including voxels that correspond to locations completely within the region of interest and voxels that correspond to locations that are partially within the region of interest; and
    calculating the attribute of the region of interest, wherein the calculation includes applying a weighting function to the corresponding attribute of voxels of the set of voxels, wherein the corresponding attribute of the voxels of the set of voxels are weighted according to signal intensity.

2. The method of claim 1, wherein the plurality of voxels are obtained using one or more of (1) magnetic resonance imaging, (2) computed tomography (CT), (3) ultrasound, (4) X-ray and (5) single photon emission computed tomography (SPECT).

3. The method of claim 1, further comprising correcting the plurality of voxels.

4. The method of claim 1, wherein the attribute is volume.

5. The method of claim 1, wherein the values correspond to intensity.

6. The method of claim 1, wherein performing region growth to identify the set of voxels includes identifying neighboring voxels whose values are within a predetermined amount of a value indicating that a voxel corresponds to a location completely within the object.

7. A computer-implemented method for determining volume of a blood-containing region of interest represented by a plurality of voxels, the method comprising:
    identifying a seed voxel that corresponds to a full-blood location completely within the region of interest;
    performing region-growth to identify a set of voxels, including full-blood voxels that corresponds to full-blood locations completely within the region of interest and partial-blood voxels corresponding to partial-blood locations that are partially within the region of interest; and
    calculating the volume of the region of interest, wherein the calculation includes applying a weighting function to volumes of voxels of the set of voxels, wherein volumes of the voxels of the set of voxels are weighted according to signal intensity.

8. The method of claim 7, wherein the signal intensities of the voxels to which the weighting function is applied are proportional to the amount of blood represented by the locations corresponding to the voxels.

9. The method of claim 7, wherein the blood-containing region of interest is part of a heart, and the weighting function is a function that takes into account the signal intensities of the set of voxels, a constant signal intensity associated with a full-blood voxel, and a constant signal intensity associated with a full-myocardium voxel.

10. The method of claim 9, wherein the weighting function is represented by the equation:

$$w(x) = \frac{x - M}{B - M},$$

where x is the intensity of a voxel of the second set of voxels, B is the signal intensity associated with a full-blood voxel, and M is the intensity of a full-myocardium voxel.

11. The method of claim 7, wherein the blood-containing region of interest is the left ventricle of a heart.

* * * * *